United States Patent
Frotz et al.

(10) Patent No.: US 11,975,642 B2
(45) Date of Patent: May 7, 2024

(54) STRUCTURAL COMPONENT, SEAT COMPONENT AND VEHICLE SEAT

(71) Applicant: Adient Engineering and IP GmbH, Burscheid (DE)

(72) Inventors: Thomas Frotz, Wermelskirchen (DE); Daniel Bahr, Kürten (DE); Rudolf Wilhelm Hemmelrath, Leverkusen (DE); Sven Oldach, Remscheid (DE)

(73) Assignee: Adient US LLC, Plymouth, MI (US)

( * ) Notice: Subject to any disclaimer, the term of this patent is extended or adjusted under 35 U.S.C. 154(b) by 173 days.

(21) Appl. No.: 17/600,177

(22) PCT Filed: Apr. 1, 2020

(86) PCT No.: PCT/EP2020/059309
§ 371 (c)(1),
(2) Date: Sep. 30, 2021

(87) PCT Pub. No.: WO2020/201384
PCT Pub. Date: Oct. 8, 2020

(65) Prior Publication Data
US 2022/0144155 A1 May 12, 2022

(30) Foreign Application Priority Data

Apr. 1, 2019 (DE) .................. 10 2019 204 571.5
Apr. 1, 2019 (DE) .................. 10 2019 204 577.4
(Continued)

(51) Int. Cl.
*B60N 2/64* (2006.01)
*B60N 2/34* (2006.01)
*B60N 2/68* (2006.01)

(52) U.S. Cl.
CPC ............... *B60N 2/646* (2013.01); *B60N 2/34* (2013.01); *B60N 2/643* (2013.01); *B60N 2/686* (2013.01)

(58) Field of Classification Search
CPC ............................. B60N 2/646; B60N 2/643
See application file for complete search history.

(56) References Cited

U.S. PATENT DOCUMENTS

| 9,022,475 B2 | 5/2015 | Brncick et al. |
| 2006/0033369 A1 | 2/2006 | Eysing |

(Continued)

FOREIGN PATENT DOCUMENTS

| CN | 105882461 A | 8/2016 |
| CN | 107080382 A | 8/2017 |

(Continued)

OTHER PUBLICATIONS

European Patent Office, International Search Report with Written Opinion in Application No. PCT/EP2020/059309, dated Jul. 20, 2020, 10 pages, Rijswijk, Netherlands.

(Continued)

*Primary Examiner* — David R Dunn
*Assistant Examiner* — Tania Abraham
(74) *Attorney, Agent, or Firm* — Marshall & Melhorn, LLC

(57) ABSTRACT

A kinetic structural component may have a flexible structure having at least one degree of freedom. The flexible structure can be moved between a compressed position and an expanded position or vice versa. The flexible structure may have at least one substructure which is configured, when said flexible structure is in the expanded position, to expand to form a curve or an arc and/or linearly.

15 Claims, 26 Drawing Sheets

(30) Foreign Application Priority Data

Apr. 1, 2019 (DE) ...................... 10 2019 204 580.4
Apr. 1, 2019 (DE) ...................... 10 2019 204 584.7

(56) References Cited

U.S. PATENT DOCUMENTS

| | | | |
|---|---|---|---|
| 2012/0119551 A1 | 5/2012 | Brncick et al. | |
| 2019/0135150 A1 | 5/2019 | Gao et al. | |
| 2020/0123355 A1* | 4/2020 | Lin .......................... | B65D 1/00 |
| 2020/0298732 A1* | 9/2020 | Gandhi .................. | B60N 2/502 |

FOREIGN PATENT DOCUMENTS

| | | | | |
|---|---|---|---|---|
| CN | 109017458 A | | 12/2018 | |
| DE | 4121768 C1 | | 10/1992 | |
| DE | 102005054125 B3 | | 5/2007 | |
| DE | 102005035586 A1 | * | 7/2007 | ............... B60N 2/22 |
| DE | 202008006781 U1 | | 7/2008 | |
| DE | 102009021654 A1 | * | 11/2010 | ............... B60N 2/02 |
| DE | 102009033883 A1 | | 1/2011 | |
| DE | 102016102512 A1 | | 8/2016 | |
| EP | 2200480 B1 | | 3/2015 | |
| GB | 1140157 A | | 1/1969 | |
| MX | 2015001013 A | | 7/2015 | |

OTHER PUBLICATIONS

China National Intellectual Property Administration, Office Action in Application No. CN202080026230.9, dated Feb. 3, 2023.

* cited by examiner

STRUCTURAL COMPONENT, SEAT COMPONENT AND VEHICLE SEAT

FIELD

The invention relates to a structural component for a seat, in particular a vehicle seat. Furthermore, the invention relates to a seat component and to a vehicle seat.

BACKGROUND

Structural components for a seat are generally known. Such structural components generally comprise a fiber-reinforced thermoplastic with integrated fiber reinforcements. In order to place the seat into various positions, such as a comfortable sitting position, a bed position or a folded position, the seat is formed in multiple parts, for example from a back rest, a seat part and a foot part, which are connected rotatably to one another by rotary or latching fittings.

SUMMARY

It is an object of the invention to specify a structural component which is adjustable in a simple manner into one of a plurality of positions and, in the process, compensates for and absorbs loads and forces which occur. Furthermore, it is an object of the invention to specify an improved seat component, in which various support variants can be set in a simple manner, and a seat having such an improved seat component.

With regard to the structural component, the object is achieved by the features of the claims. With regard to the seat component, the object is achieved by the features of the claims. With regard to the seat, the object is achieved by the features of the claims.

Developments of the invention are the subject matter of the dependent patent claims.

The object is achieved according to the invention by a structural component, in particular a kinetic structural component, which comprises a flexible structure having at least one degree of freedom, in particular at least one translational degree of freedom and/or at least one rotational degree of freedom, wherein the flexible structure is movable between a compressed position and an expanded position or vice versa, and wherein the flexible structure comprises at least one subregion or a substructure which is configured, in the expanded position, to expand to form a curve or arc and/or in a linear manner. Furthermore, the subregion or the substructure of the flexible structure is configured, in the compressed position of the flexible structure, to compress to form a substantially flat or rectilinear surface.

Forces acting on the flexible structure, for example controlled compressive or shearing forces, can be absorbed here and transferred in order to change the volume, shape, dimensions and/or position of the flexible structure, in particular of subregions thereof, during the expansion or compression, and to move same in particular in a curved or arcuate and/or linear manner. For example, forces acting on the flexible structure, for example controlled compressive or shearing forces, can be absorbed and transferred in order to change the shape, dimensions and/or position of the flexible structure, in particular of subregions thereof, in particular to move same in a linear manner and/or to tilt or inclined same.

For example, subregions or substructures are moved during the expansion in such a manner, in particular are placed upright, tilted, inclined or unfolded, in such a manner that, during an expansion, the subregion or the substructure has an arcuate or curved outer surface or a linearly expanded shape, in particular a linear expansion or extension. During the compression, the subregion(s) or substructure(s) is or are moved back, in particular collapsed or folded.

In particular, the substructure comprises a plurality of expansion elements which are coupled in an articulated manner to one another in a row and/or in parallel in order, in the at least one degree of freedom, in particular in at least two or more degrees of freedom, to expand into the expanded position or to compress into the compressed position.

For example, the flexible structure or else the substructure is designed as a monolithic flexible structure. In particular, the flexible structure comprises a plurality of expansion elements, such as links, joints and/or levers, which are connected to one another in a row and/or in parallel in order, in the at least one degree of freedom, in particular in at least two or more degrees of freedom, to expand or to compress.

One possible embodiment makes provision for the substructure to be designed as a flexible grid having a plurality of lever elements, wherein the lever elements are articulated on at least one moving link by lever joints.

The lever joints are designed, for example, as film hinges or film joints or conventional rotary joints. Film hinges or film joints are in particular what are referred to as strap hinges and are not from mechanical parts, such as a rotary joint. Film hinges or film joints are in particular flexible, thin-walled hinge straps between two parts to be connected, such as the lever element and the moving link. For example, in the case of injection molded parts, the film hinges or film joints are formed from an elastomer, in particular from a thermoplastic elastomer, for example form polypropylene or EPDM, because of the necessary softness and extensibility of such a material for permanent flexible operation of the lever joints. Such thin-walled film hinges or film joints made from plastic, such as polypropylene, afford a high flexural fatigue strength, and therefore the film hinges or film joints are durable and long-lasting.

The lever elements are designed, for example, as ribs, webs and/or strips. The lever elements are formed in particular as injection-molded parts, for example from an elastomer, in particular from a thermoplastic elastomer, for example from polypropylene or EPDM. The lever elements can be formed here in particular from a harder plastic than the lever joints and/or from a softer plastic than the moving links.

Furthermore, the lever elements can be arranged, for example, in a diamond-shaped manner. In particular, the constantly recurring lever element is arranged between longitudinal elements in such a manner that the grid comprises diamonds which are mirrored with respect to one another along longitudinal elements and which change their shape and move, in particular expand linearly or compress linearly depending on the acting and controlled force. The respective diamond is formed here by parallel and spaced-apart longitudinal elements which are connected to one another by the lever elements, for example planar webs, which are articulated on the longitudinal elements. The recurring lever elements between the longitudinal elements form parallel and series kinematics, as a result of which the structural component expands linearly or compresses linearly.

The one end of the respective lever element or of the respective web of diamonds mirrored with respect to one another is connected towards the center to a central longitudinal element or to a central part, in particular a control part. The central longitudinal element forms the mirror axis of the diamonds which are mirrored with respect to one another. The opposite end of the respective lever element or the respective web of diamonds which are mirrored with respect to one another is connected to an outer longitudinal element or to a diamond outer surface which, in turn, is connected to the next compensating element or forms an outer surface of the grid and thus the flexible structure.

Since the diamond outer surfaces of the lever elements expand linearly, they can be connected to form an expanding grid. If the grid expands, the respective central parts move 90° for the expansion. If the movement of the central parts is activated, the entire grid and thus the flexible grid expands or compresses.

The grids can be scaled as desired, and therefore it is possible to adapt the expansion or compression and the stability to the desired use or the desired application.

The moving link or the moving links is or are designed, for example, to be narrow or flat. For example, the moving link or the moving links is or are designed as (a) moving rib(s), as (a) moving web(s), as (a) moving strip(s) and/or as (a) moving surface(s). The moving link or the moving links is or are formed in particular as an injection molded part, for example from a harder plastic than the lever elements and/or the lever joints, in particular from a thermoplastic, for example from PMMA, PC or PC/ABS.

The lever joints, the lever elements and/or the moving link or the moving links can be designed as an injection molded part, in particular an injection molded flexible grid. Alternatively, the flexible grid can be formed from parts coupled to one another in an articulated manner.

Furthermore, the flexible structure can be surrounded by one or more, in particular outer surface elements, in particular by padding, a cover or the like, for example by a foam cushion, a foam shell or a foam plate. The outer surface element(s) can be coupled in terms of movement here in particular to the inner substructure. For example, the outer surface element is coupled in terms of movement to the respective moving link of the substructure.

Furthermore, the kinetic structural component can be formed as a monolith from the outer surface elements and the inner flexible structure, in particular from a flexible grid with lever joints having a horizontal axis of rotation. The flexible structure can also be formed from a plurality of parts, for example a combination of a grid structure and a row structure.

The flexible structure, in particular the substructure, can be formed here form a constantly recurring mechanical expansion element, in particular lever element, which elements are connected in an articulated manner to one another, in particular by the moving links, to form a row. The lever elements here can have different lengths, and therefore the lever elements, which are arranged in a row, spread out in an arcuate or curved manner in the expanded state. Alternatively or additionally, the lever elements can have identical lengths, and therefore the lever elements, which are arranged in a row and/or parallel to one another, spread out linearly.

Furthermore, multiple rows of expansion elements or lever elements, in particular a double row or triple row consisting of individual rows of expansion elements arranged next to one another and/or one above another can be provided.

The expansion elements or lever elements are designed, for example, in a Z- or L-shaped manner. Furthermore, the expansion elements or lever elements are designed to be spring-elastic. In particular, the constantly recurring expansion element or lever element is arranged between the outer surface elements in such a manner that it changes its shape and moves, in particular expands, in particular spreads out or unfolds, depending on an acting and controlled force. The recurring expansion elements or lever elements here form a row of series kinematics, as a result of which the structural component or subregions thereof expands/expand or compresses/compress in an arcuate or curved manner over a predetermined length or the entire length of the seat or seat components by the expansion elements or lever elements in the row expanding synchronously, in particular opening up, spreading out, and folding or being placed upright, or synchronously compressing, in particular folding down, relaxing, folding or collapsing.

The one end of the respective expansion element or lever element, in particular of a web-shaped, strip-shaped, rib-shaped or plate-like lever, is connected to one of the outer surface elements or to a moving link, in particular is articulated thereon. The opposite end of the respective lever element is connected to the other outer surface element or to another moving link, in particular is articulated thereon.

A further embodiment makes provision for the substructure to be coupled in terms of movement to the outer surface element(s) in such a manner that the substructure changes its shape, in particular its volume, and moves, in particular expands, in particular spreads out or unfolds, or compresses, in particular contracts or folds, depending on a controlled force acting on the moving link or the moving links of the substructure.

If the movement of the expansion elements or lever elements is activated, in particular synchronously, by the moving links and/or the outer surface elements, the entire row and thus the flexible structure or a substructure expands or compresses. For the activation, in particular a kinetic force is applied to the outer surface element or the outer surface elements and/or to the moving link or to the moving links.

The row of expansion elements or lever elements can be scaled as desired, and therefore it is possible to adapt the expansion or compression and the stability to the desired use or the desired application.

With regard to the seat component, in particular a back rest or a seat part, the object is achieved according to the invention by the seat component comprising at least a supporting structure, padding and/or a cover, and a structural component, as described previously in all its various embodiments, wherein at least the substructure is coupled in terms of movement to the padding and/or to the cover. In one possible embodiment, the respective moving link is coupled in terms of movement to the padding and/or to the cover. The structural component can be arranged here between the supporting structure and the padding and/or the cover and can form at least a subregion of the seat component or the entire seat component.

With regard to a seat, the object is achieved according to the invention by the seat comprising at least two seat components which are movable with respect to one another and of which at least one movable seat component has the structural component described previously in the various embodiments, wherein, when the movable seat component moves relative to the other seat component, the flexible structure of the structural component is movable into an expanded or into a compressed position.

If the structural component having the inner flexible structure described previously is used for a seat, in particular a vehicle seat or aircraft seat, wherein subregions of the seat or one of the seat components, such as a lumbar support or side flanks, is formed from the in particular monolithic flexible structure, during an adjustment of the seat, for example from a sitting position into a lying position, the expansion or compression of the in particular monolithic flexible structure in the subregion of the seat can permit a corresponding support and thus adaptation to various requirements. The flexible structure, in particular the substructure or subregion thereof, can thus be activated and moved, for example, in such a manner that the seat in a sitting position or comfort position has more lateral support than in a lying position or bed position. Alternatively, the flexible structure can form the entire surface of the seat. The expansion elements or lever elements can be arranged under a padding, in particular foam padding, and can correspondingly move under the foam padding in the event of an expansion in the direction of the foam padding, in particular can be placed upright or can spread out, in particular vertically, in particular to form a curve or arc and/or in a linear manner, and can press against the foam padding, and therefore a corresponding support is made possible. Alternatively, the row of expansion elements or lever elements can be integrated in the foam padding, in particular can be arranged directly in the latter, and, in the event of an expansion, can move in the direction of a surface of the foam padding, in particular can be placed upright or can spread out, in particular vertically, to form a curve and/or arc and/or in a linear manner.

In one possible embodiment, for example, at least one row of expansion elements or lever elements in the longitudinal extent of the seat is arranged in the region of a side flank or a lumbar support which permits sufficient support for the adjacent padding relative to the seat movement, such as a back rest or seat part movement, and thus improved comfort for the user of the seat.

For example, the at least one row of expansion elements or lever elements can relax in a lying position or bed position of the seat. In particular, the lever elements are configured in such a manner that, in the compressed state, in particular in the folded or unfolded state, they spring in the expansion direction, for example in the Z direction. In a sitting position or take-off and landing position of the seat, the expansion elements or lever elements are expanded, in particular spread, placed upright, opened up or unfolded, and increase a support, for example, in a side flank and thus the lateral support and the comfort for the user.

In one possible embodiment, the expansion of the expansion elements or lever elements takes place by a length compensation in the adjustment of the back rest with respect to the feet part. An electric motor can optionally be provided. The size, shape and configuration of the expansion elements or lever elements and the expansion factor thereof can be scaled as desired.

The expansion elements or lever elements, distributed in a variety of rows one above another and/or next to one another or on a surface, can form a three-dimensional plastics structure below or in the padding.

If the structural components having the inner flexible structure described previously is used for a seat, in particular a vehicle seat or aircraft seat, wherein the entire seat is formed form a monolithic flexible structure with structural regions for a back rest, a seat part and a foot support, the expansion or compression of the monolithic flexible structure and thus an adjustment of the seat into a desired position can be controlled by a movement of the foot support with respect to the seat part and/or of the back rest with respect to the seat surface. If, for example, the foot support (also called foot rest or foot extension) is moved with respect to the seat part (also called seat cushion or seat surface) into a comfort position or design position (for example into a position of the foot support with respect to the seat cushion of 90 degrees), the compensation structure expands. Conversely, the flexible structure is compressed in a lying position in which the foot support is arranged with respect to the seat part in a plane or at an angle of 0°.

In a further embodiment, the respective longitudinal element, in particular the central part or control part, but also the outer longitudinal elements or diamond outer surfaces, can be divided in order to form a pivot point or buckling point for the structural component. In other words: the longitudinal elements—the central/control parts and the outer longitudinal elements/diamond outer surfaces—form longitudinal levers. In the region of the pivot point or buckling point, the respective longitudinal element has a joint, in particular a solid-state joint. The joint has, for example, a tapering or notch on one side in order to form an axis of rotation which runs perpendicularly to the longitudinal extent of the respective longitudinal element. Alternatively, the joint can also have a tapering or notch on two sides.

For example, in the case of a structural component for a seat, the longitudinal elements are divided in the transition region between back rest and seat part or between seat part and foot support and are provide with a joint, for example a solid-state joint.

If the longitudinal levers of the diamonds are each arranged against one another at the pivot point or buckling point, the path that the axis of rotation or the point of rotation defines can allow the flexible structure to expand. The linearly expanding part, in particular the outer longitudinal elements or diamond outer surfaces of the grid, has its pivot point or buckling point closer to the actual axis of rotation or to the actual point of rotation of the flexible structure. The driving central part or the control part has its pivot point or buckling point further away from the axis of rotation or from the point of rotation. This has the result that the expansion of the grid structure interacts with the movement of the foot support with respect to the seat part.

In one possible embodiment, the kinetic structural component is produced from plastic, in particular by injection molding, stamping or by 3D printing. This enables joints having very thin webs to be produced. The formation of the flexible structure having series joint kinematics from plastic permits permanent flexible fatigue strength and high tensile/compressive strength.

In particular, the flexible structure and/or the subregions thereof can be produced in the form of a flexible 3D plastics structure by injection molding or by 3D printing. It is also possible to produce the entire kinetic structural component with the outer surface elements and the flexible structure provided between the latter by injection molding or by 3D printing.

The surface elements of the structural component are in particular designed to be shell-shaped or cushion-shaped, for example to be plate-like. The outer surface elements can have a planar shape. Alternatively, they can be ergonomically shaped and of flat design.

The advantages obtained with the invention consist in particular in that the flexible structure and therefore the structural component are stable, in particular torsion proof, during the expansion or the compression. Furthermore, the serially arranged expansion elements or lever elements are synchronously expanded or compressed over the entire extent of the structural component and/or of subregions, as a result of which the variable, different support of the user of the seat in relation to the surface is permitted. The expansion movement or compression movement of the flexible structure and/or of the subregions is controllable and scaleable here.

The flexible row-shaped 3D configuration of the flexible structure or of subregions thereof permits complex structures which expand in a simply controlled and driven manner to form a curve or an arc.

Furthermore, owing to the different flexible configuration and shape, the flexible structure makes it possible for regions of the flexible structure to expand or compress in different directions.

In the case of a structural component forming a seat having a foot support, a seat part and a back rest, the foot support, the seat part and the back rest and/or subregions thereof, such as side flank regions and lordosis region, can be changed in shape and/or size at various points with the movement of the flexible structure. A separate drive can optionally be provided in order to correspondingly control the expansion or compression of the flexible structure.

DESCRIPTION OF THE FIGURES

Exemplary embodiments of the invention will be explained in more detail with reference to drawings, in which.

Mutually corresponding parts are provided with the same reference signs in all of the figures.

DETAILED DESCRIPTION

Figure 1A:
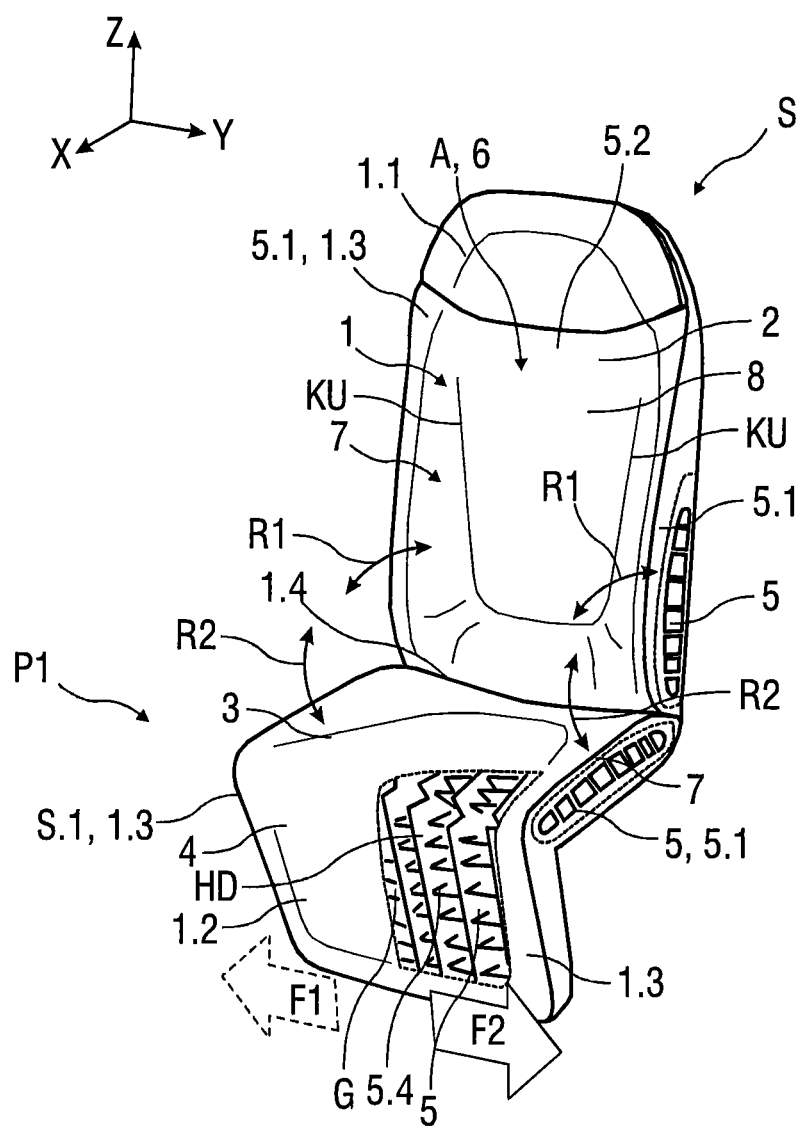
FIG. 1A shows, schematically in a perspective view, an embodiment of a structural component having a cover as a seat in one position.
Figure 1B:
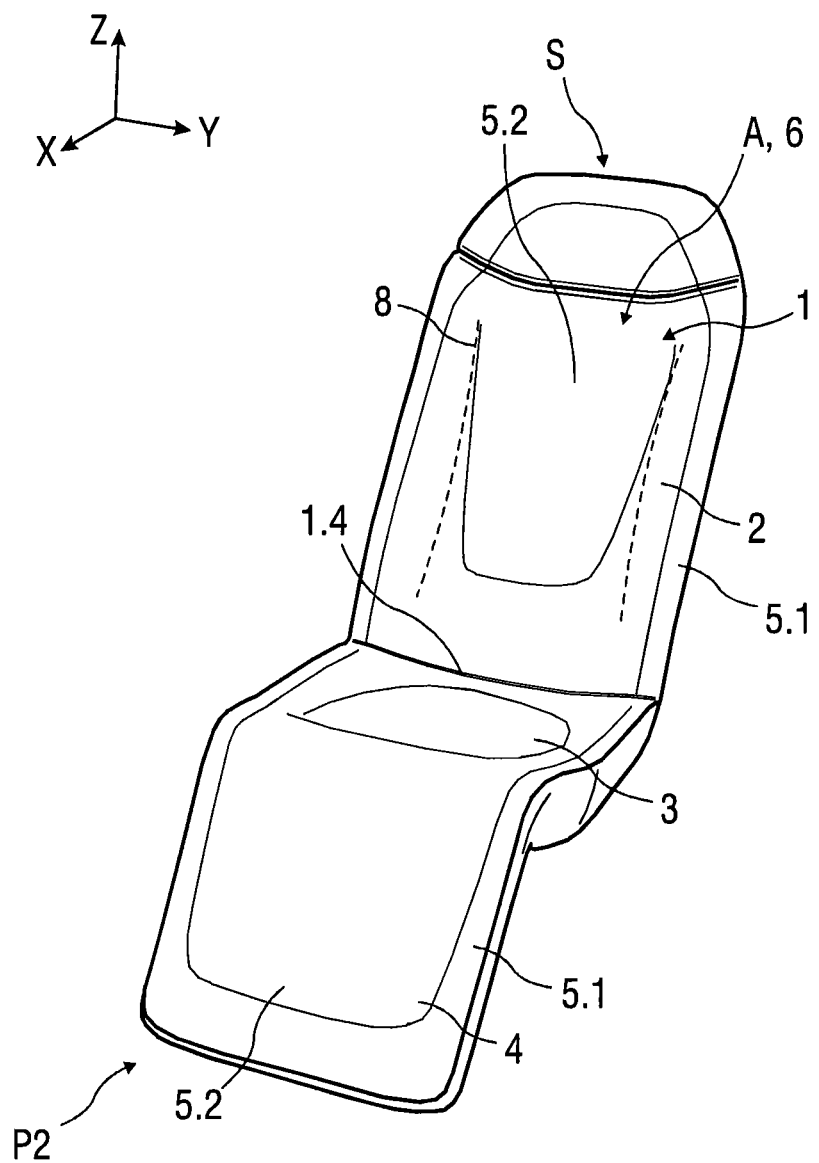
FIG. 1B shows, schematically in a perspective view, an embodiment of a structural component having a cover as a seat in another position.
Figure 1C:
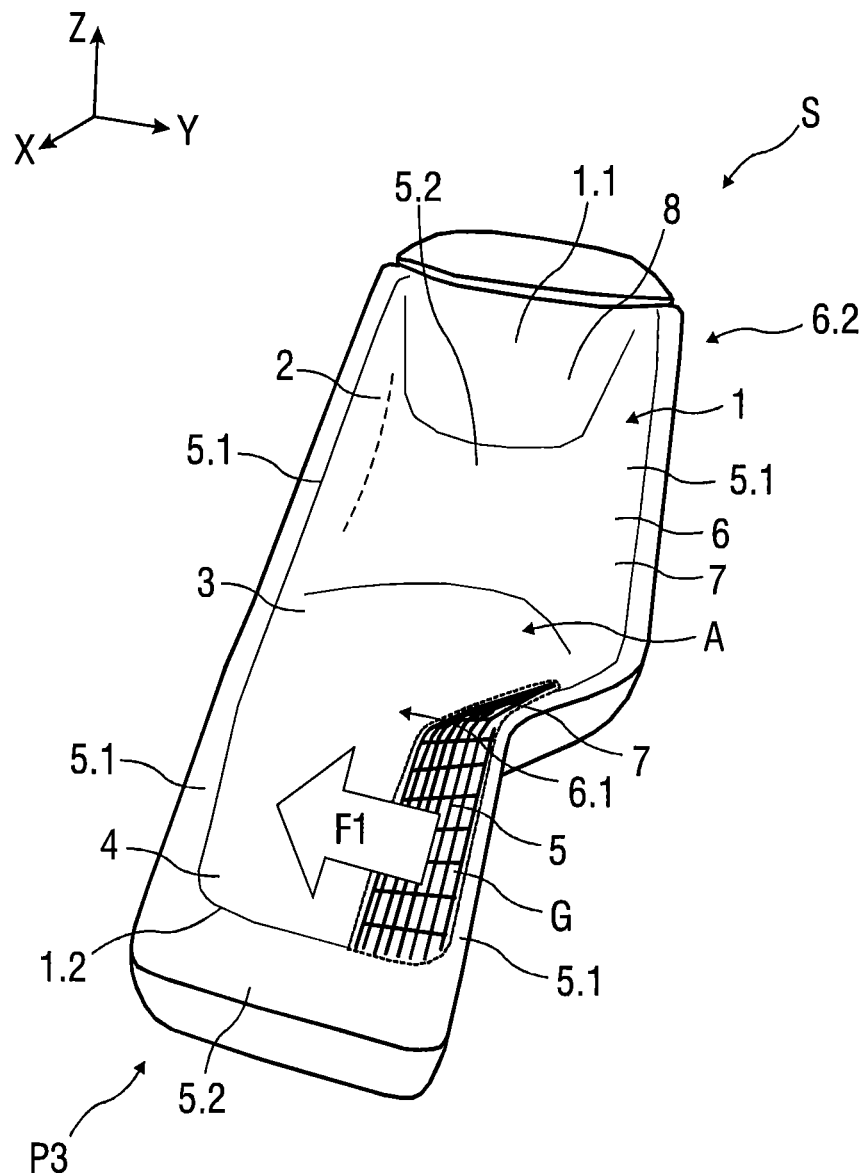
FIG. 1C shows, schematically in a perspective view, an embodiment of a structural component having a cover as a seat in another position.

FIGS. 1A to 1C show, schematically in a perspective illustration, an embodiment of a structural component 1 as a seat S in various positions P1 to P3. The seat S comprises at least a back rest 2, a seat part 3 and a foot support 4.

Position P1 shows the seat S, for example, in a sitting position with a substantially upright back rest position, for example in what is referred to as a TTL position. Position P2 shows the seat S, for example, in a comfortable sitting position with a back rest 2 inclined rearward and with an upwardly inclined foot support 4. Position P3 shows the seat S, for example, in a lying position or bed position with a back rest 2 inclined substantially completely rearward and with a foot support 4 inclined substantially completely upward.

The structural component 1 is designed, for example, as a kinetic structural component 1 having different structural regions 1.1, 1.2. The structural component 1 comprises a flexible structure 5 having at least one degree of freedom F1, F2, in particular at least one translational degree of freedom F1, F2, and/or at least one rotational degree of freedom R1, R2.

The flexible structure 5 here is configured to compress or to expand in an arcuate or curved manner, for example in the direction of the degree of freedom F1 and/or F2 and of the rotational degree of freedom R1 and/or R2. Alternatively or additionally, the flexible structure 5 is configured to compress or to expand in a linear manner, for example in the direction of the translational degree of freedom F1 or F2.

In the case of the seat S illustrated in FIGS. 1A to 1C, the flexible structure 5 extends over an entire seat length and forms a continuous surface from the back rest 2 over the seat part 3 as far as the foot support 4. Alternatively, the flexible structure 5 can also extend only over the respective seat component—the back rest 2 or the seat part 3, and therefore two separate flexible structures 5 are provided for a seat S.

The flexible structure 5 is configured here at least in regions to expand to form an arc or a curve KU. For example, the flexible structure 5 comprises at least one substructure 5.1 which extends, for example, along at least one of the two side flanks 1.3 of the back rest 2, of the seat part 3 and/or the foot support 4, and which is configured to expand to form a curve KU. Flexible substructures 5.1 adjacent to the respective substructure 5.1 are configured to expand in a linear manner. The substructure(s) 5.1 expands/expand to form such a curve KU which, in the expanded state, is located higher at least in regions than the linearly expanded adjacent substructure(s) 5.2. A lateral support for the user of the seat S is thereby made possible in a simple manner.

The flexible structure 5 is a flexible structural element which forms a support for padding 7. For example, the flexible structure 5 is designed as a monolithic flexible structural element and is arranged below the padding 7.

In one possible embodiment, the kinetic structural component 1, in particular the flexible structure 5 and the substructures 5.1, 5.2 thereof, is produced from plastic, in particular produced by injection molding, stamping or by 3D printing. Joints having very thin webs can thereby be formed. The formation of the flexible structure 5 with parallel and/or serial joint kinematics made from plastic permits permanent flexural fatigue strength and a high tensile/compressive strength.

In particular, the flexible structure 5 can be designed, at least in the substructure(s) 5.2, in the form of a flexible grid G, in particular a plastics grid, and can be produced by injection molding or by 3D printing.

For example, the flexible substructure 5.2 can extend over the entire central region of the seat S, wherein the adjacent flexible substructures 5.1 extend in the region of side flanks 1.3 or of a lumbar support 1.4 of the seat S.

Furthermore, the flexible structure 5, in particular the respective substructure 5.1, 5.2, can be arranged on and fastened to an associated supporting structure T, in particular a frame-shaped or plate-like or shell-shaped supporting structure T.

The covering A is designed as a surface element 6 that outwardly covers or surrounds the flexible structure 5. The covering A comprises the padding 7 as a lower part and, as an upper part, a cover element 8 which covers the padding 7 at least on the surface side serving as a sitting/lying surface. The padding 7 is in particular foam padding and can be designed, for example, as a flat foam cushion or a foam shell. Alternatively, the covering A can also be formed only from a padded cover element 8.

The covering A as an outer surface element 6 can cover or surround the flexible structure 5 on the upper and lower sides. The upper side of the covering A here has a first flexible, in particular padded surface element 6.1. The lower side of the covering A has a second flexible, for example plate-like or shell-shaped, surface element 6.2.

The flexible substructure(s) 5.1 is or are configured to absorb forces acting thereon, for example controlled compressive or shearing forces, and optionally to transfer same in order to change the volume, shape, dimensions, in particular height, and/or position of the flexible substructure(s) 5.1 during the expansion or compression, in particular to move same in a curved or arcuate and/or linear manner. In particular, the flexible substructure(s) 5.1 is or are placed upright or unfolded to form the curve KU during the expansion or to collapse or fold during the compression.

Furthermore, the kinetic structural component 1 can be formed by the monolith from the outer flexible surface elements 6.1, 6.2 and the inner flexible structure 5 having the flexible substructures 5.1 with rows R0 of expansion elements 5.3 having a horizontal axis of rotation HD (FIGS. 2 to 7) and the flexible substructures 5.2 having the flexible grid G with lever joints having a horizontal axis of rotation HD and vertical axis of rotation VD (FIGS. 1A to 1C).

Figure 2A:
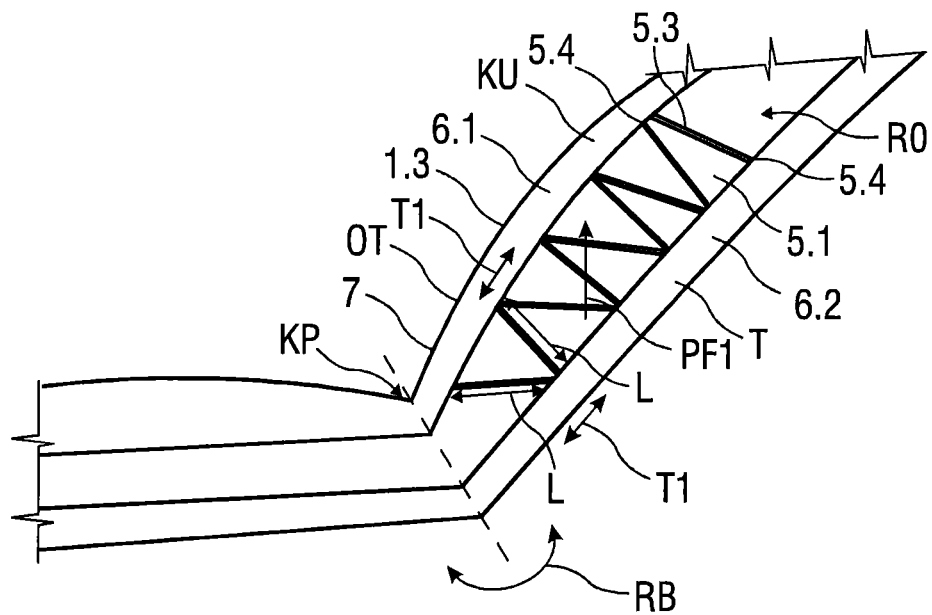
FIG. 2A shows, schematically in a sectional illustration, an embodiment with a structural component having a flexible structure as a row of expansion elements arranged in a meandering manner, in the expanded state.
Figure 2B:
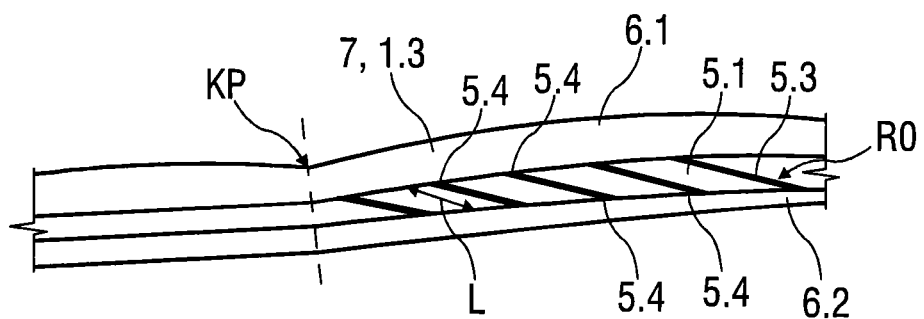
FIG. 2B shows, schematically in a sectional illustration, an embodiment with a structural component having a flexible structure as a row of expansion elements arranged in a meandering manner, in the expanded state.

FIGS. 2A, 2B show, schematically in a sectional illustration, an embodiment of a flexible substructure 5.1 with a row R0 of expansion elements 5.3.

FIG. 2A shows, schematically in a sectional illustration, the flexible substructure 5.1, for example for a side flank 1.3. The expansion elements 5.3 which are arranged serially in the row R0 are placed upright or spread out in the expanded state and form the curve KU. In one of the sitting positions P1 or P2 of the seat S, the expansion elements 5.3 are substantially completely placed upright or spread out and form a secure lateral support.

FIG. 2B shows, schematically in a sectional illustration, the flexible substructure 5.1 in the partially compressed state in which the expansion elements 5.3 are folded or folded down. In the lying position P3 of the seat S, the expansion elements 5.3 are partially folded or folded down or placed obliquely.

The expansion elements 5.3 are arranged in a meandering manner between the upper flexible, in particular padded, surface element 6.1 and the lower flexible surface element 6.2.

The flexible substructure 5.2 can be formed here from a constantly recurring, identical, mechanical expansion element 5.3, in particular a lever element, said element being connected to form a row R0. The expansion elements 5.3 here can have different lengths L, and therefore the expansion elements 5.3, which are arranged in a row R0, spread out in an arcuate or curved manner in the expanded state and form an arcuate or curved surface OF.

The one end of the respective expansion element 5.3, in particular of a web-shaped or plate-like lever, is connected to the outer and padded, flexible surface element 6.1, in particular is articulated thereon by a joint 5.4, in particular a solid-state joint. The opposite end of the respective expansion element 5.3 is connected to the other outer flexible surface element 6.2, in particular is articulated thereon by a further joint 5.4, in particular a solid-state joint.

If the movement of the expansion elements 5.3 is activated, for example synchronously, according to arrow PF1, the entire row R0, and therefore the flexible substructure 5.1, expands to form the curve KU.

The activation of the expansion elements 5.3 can take place inevitably here by a linear movement T1 or rotational movement RB of the back rest 2 or of another component of the seat S. In the case of the rotational movement RB of the back rest 2 relative to the seat part 3, corresponding padding regions of the padding 7 move relative to one another in the region of a buckling point KP.

The row R0 of the expansion elements 5.3 can be scaled as desired, and therefore it is possible to adapt the expansion or compression and the stability to the desired use or the desired application of the structural component 1.

Figure 3:
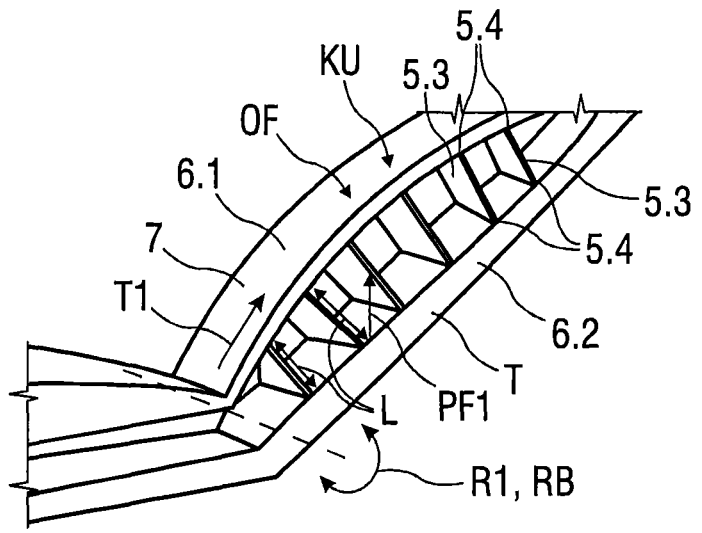
FIG. 3 shows, schematically in a sectional illustration, an embodiment with a structural component having a flexible structure as a row of expansion elements arranged parallel to one another, in the expanded state.

FIG. 3 shows, schematically in a sectional illustration, an alternative embodiment for expansion elements 5.3 which are arranged in a row R0 and parallel to one another in the expanded state.

Figure 4:
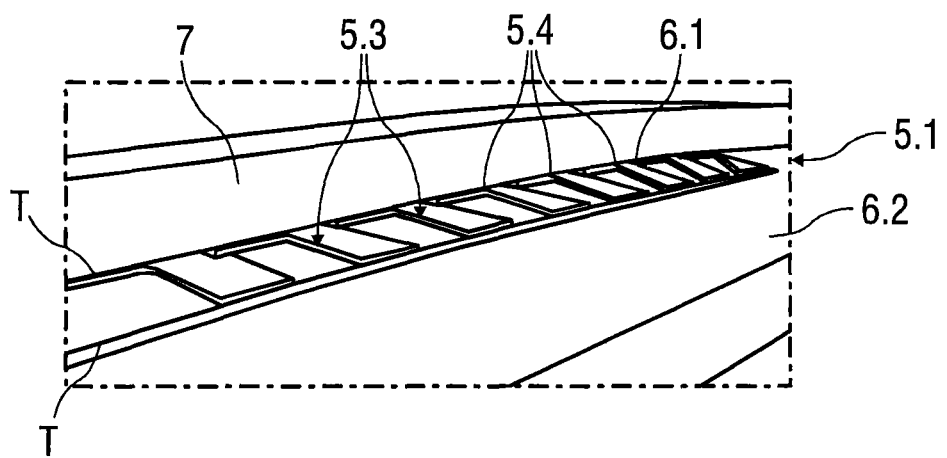
FIG. 4 shows, schematically in a sectional illustration, an embodiment with a structural component having a flexible structure as a row of expansion elements arranged in a Z-shaped manner.

FIG. 4 shows, schematically in a sectional illustration, an embodiment of a flexible substructure 5.1 with a row R0 of expansion elements 5.3 configured in a Z-shaped manner. Alternatively, the expansion elements 5.3 can be designed in a L-shaped manner. The expansion elements 5.3 are arranged between two flexible surface elements 6.1, 6.2, wherein the upper flexible surface element 6.1 is provided with the padding 7.

Figure 5:
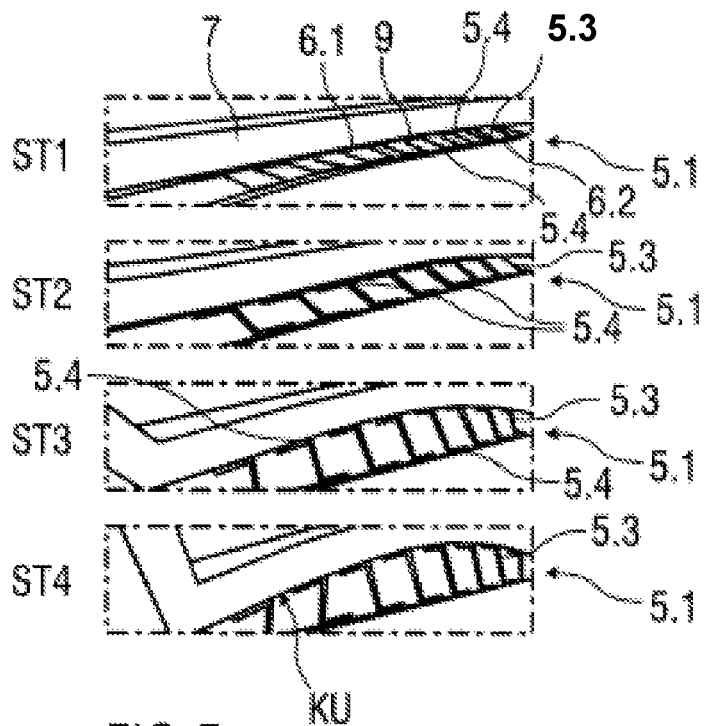
FIG. 5 shows, schematically in a sectional illustration, an embodiment of a structural component having a flexible structure as a single row of expansion elements.

FIG. 5 shows, schematically in a sectional illustration, the flexible substructure 5.1 according to FIG. 4 in various expansion steps ST1 to ST4 from the top, in a substantially compressed position, downward in a completely expanded position in which the expansion elements 5.3 have been expanded to form the curve KU.

Figure 6:
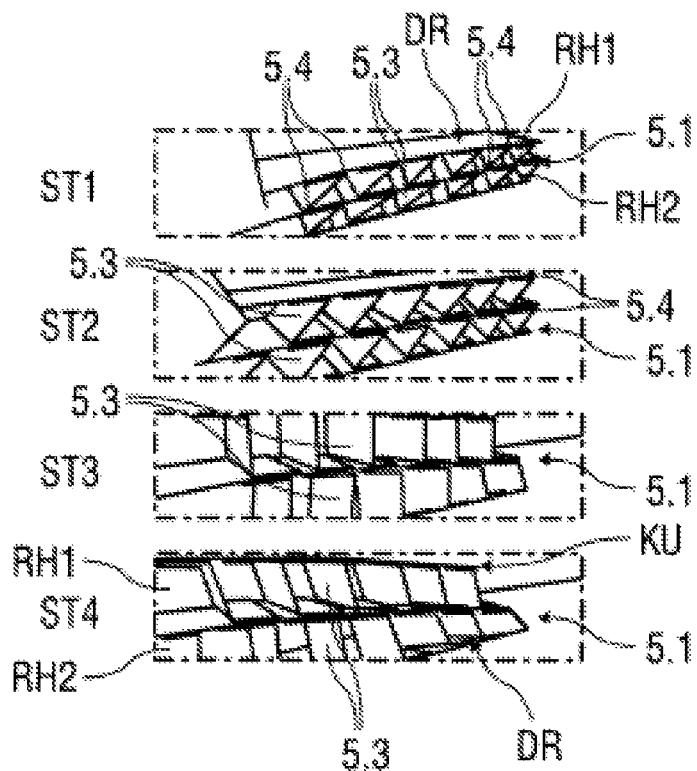
FIG. 6 shows, schematically in a sectional illustration, an embodiment of a structural component having a flexible structure as a double row of expansion elements.
Figure 7:
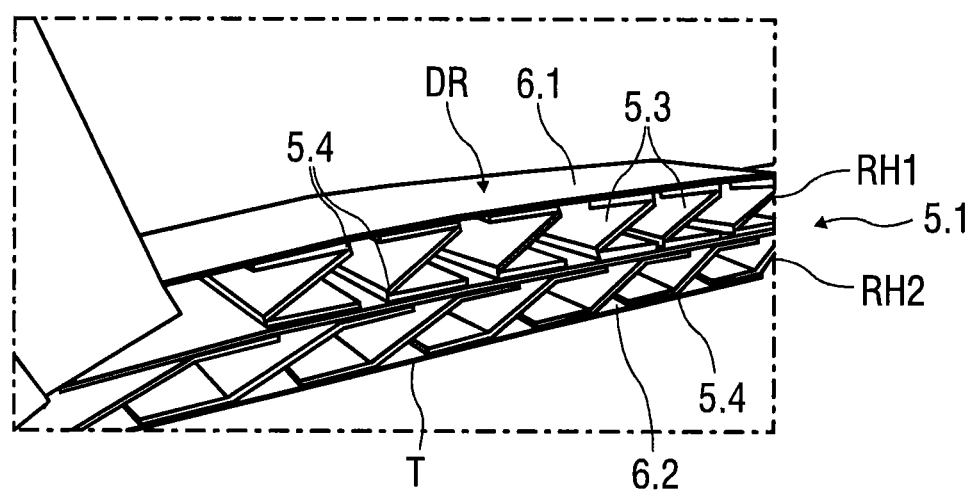
FIG. 7 shows, schematically in a sectional illustration, an embodiment of a structural component having a flexible structure as a double row of expansion elements.

FIGS. 6 and 7 show, schematically in a sectional illustration, an embodiment of a flexible substructure 5.1 with a double row DR of expansion elements 5.3 without padding 7.

FIG. 6 here shows the flexible substructure 5.1 of FIG. 7 in various expansion steps ST1 to ST4 from the top, in a substantially compressed position, downward in a completely expanded position in which the expansion elements 5.3 have been expanded to form the curve KU.

The double row DR of expansion elements 5.3 is formed here from individual rows RH1, RH2 of expansion elements 5.3 arranged one above another.

In other words: the expansion elements 5.3, for example lever elements, distributed in a plurality of rows RH1, RH2 one above another and/or next to one another or over a surface, can form a three-dimensional plastic structure below or in the padding 7.

The expansion elements 5.3 of all the previously described exemplary embodiments are furthermore designed to be spring-elastic. In particular, the constantly recurring expansion element 5.3 is arranged between the outer flexible surface elements 6.1, 6.2 in such a manner that it changes its shape and moves, in particular expands, in particular spreads out or unfolds to form the curve KU, depending on an acting and controlled force. The recurring expansion elements 5.3 of a row R0 here form serial kinematics, as a result of which the structural component 1 or the subregions thereof, such as the side flanks 1.3 and/or the lumbar support 1.4, expands/expand or compresses/compress in an arcuate or curved manner over their length by the expansion elements 5.3 of the row(s) R0 synchronously expanding, in particular opening up, spreading out, unfolding or being placed upright, or synchronously compressing, in particular folding down, relaxing, folding or collapsing.

Figure 8:
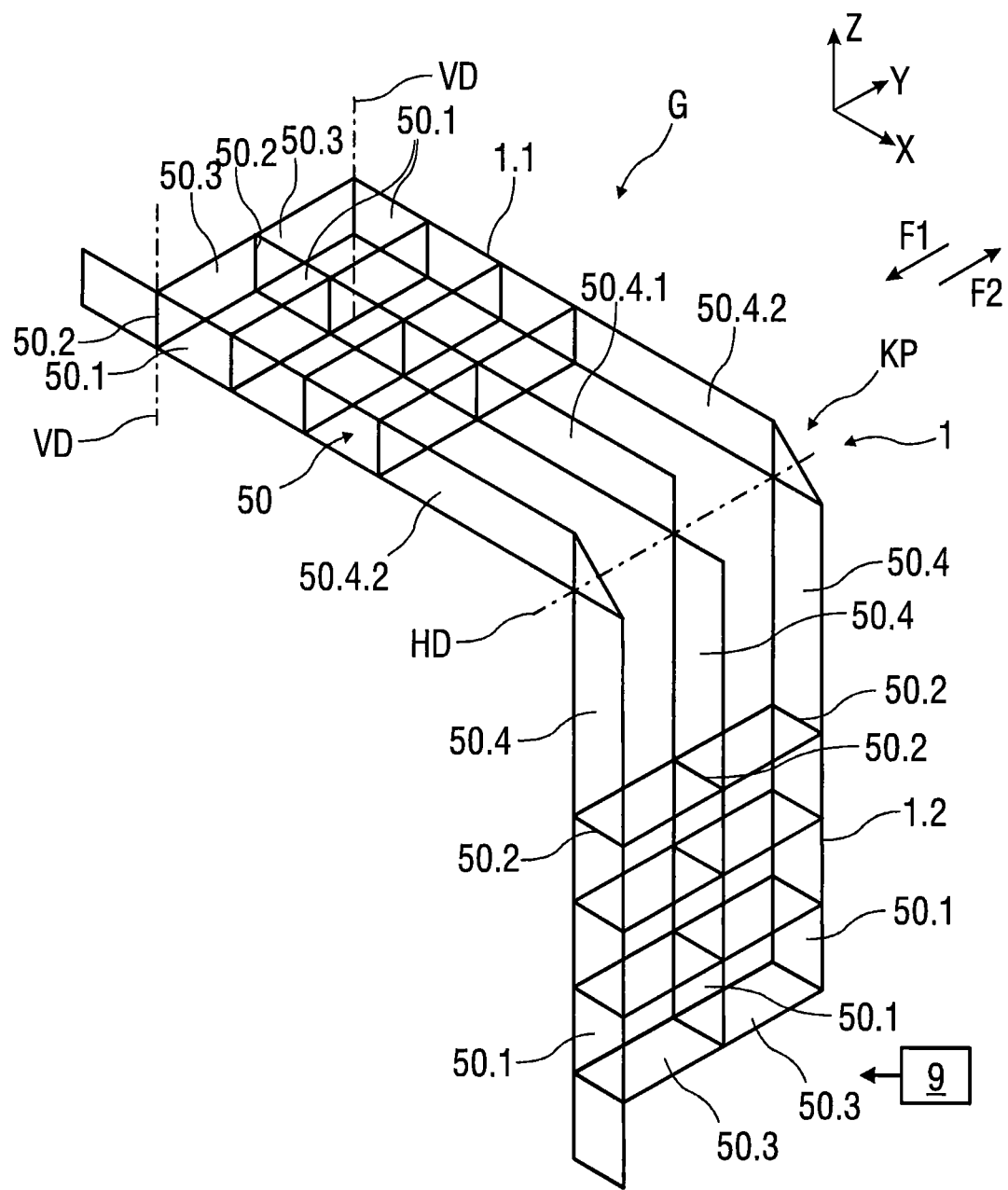
FIG. 8 shows, schematically in a perspective illustration, an embodiment of a flexible structure for a structural component in the region of a pivot point or collapsing point between two structural regions which are pivotable relative to each other.
Figure 9:
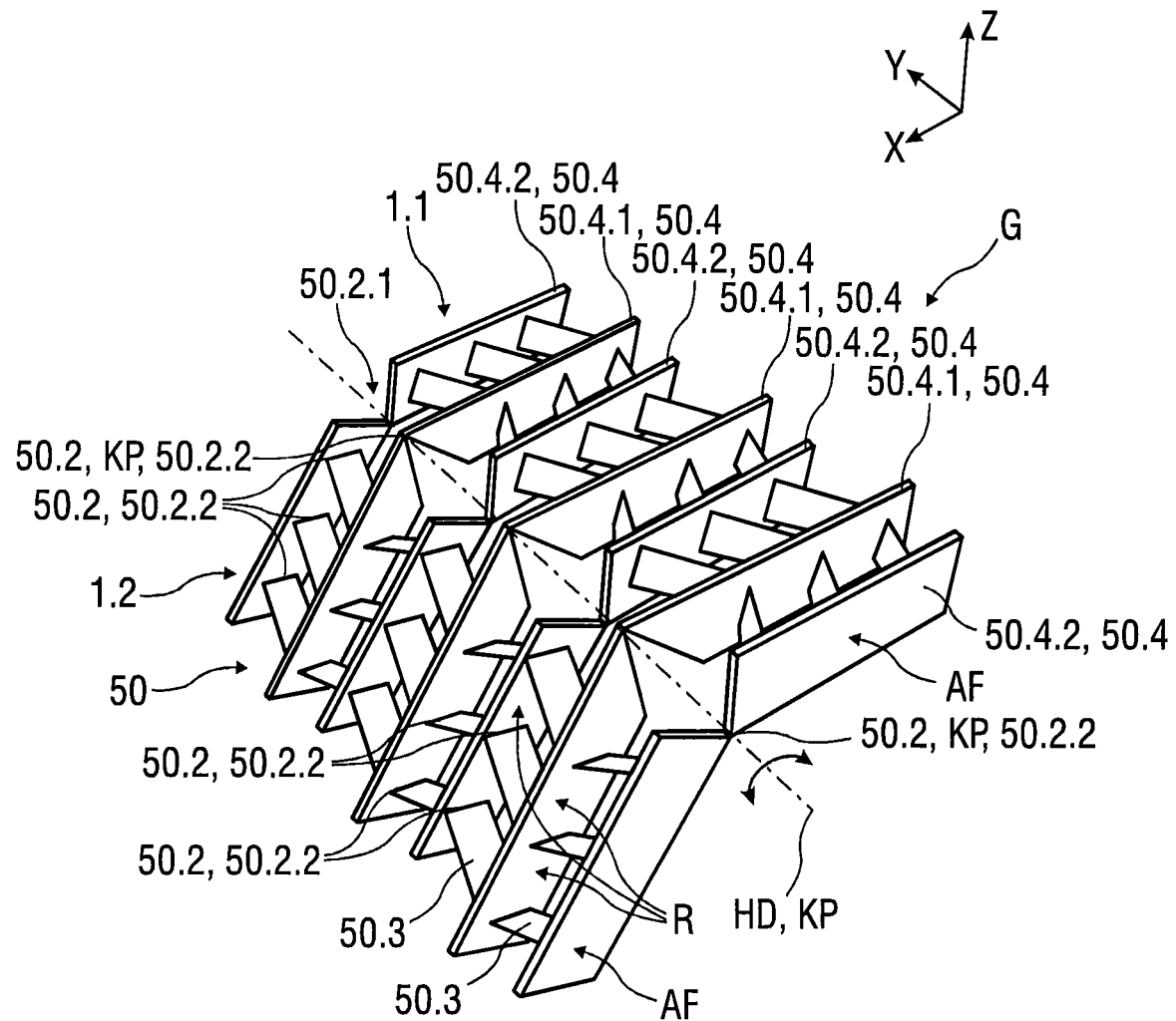
FIG. 9 shows, schematically in a perspective illustration, an embodiment of a flexible structure for a structural component in the region of a pivot point or collapsing point between two structural regions which are pivotable relative to each other.
Figure 10:
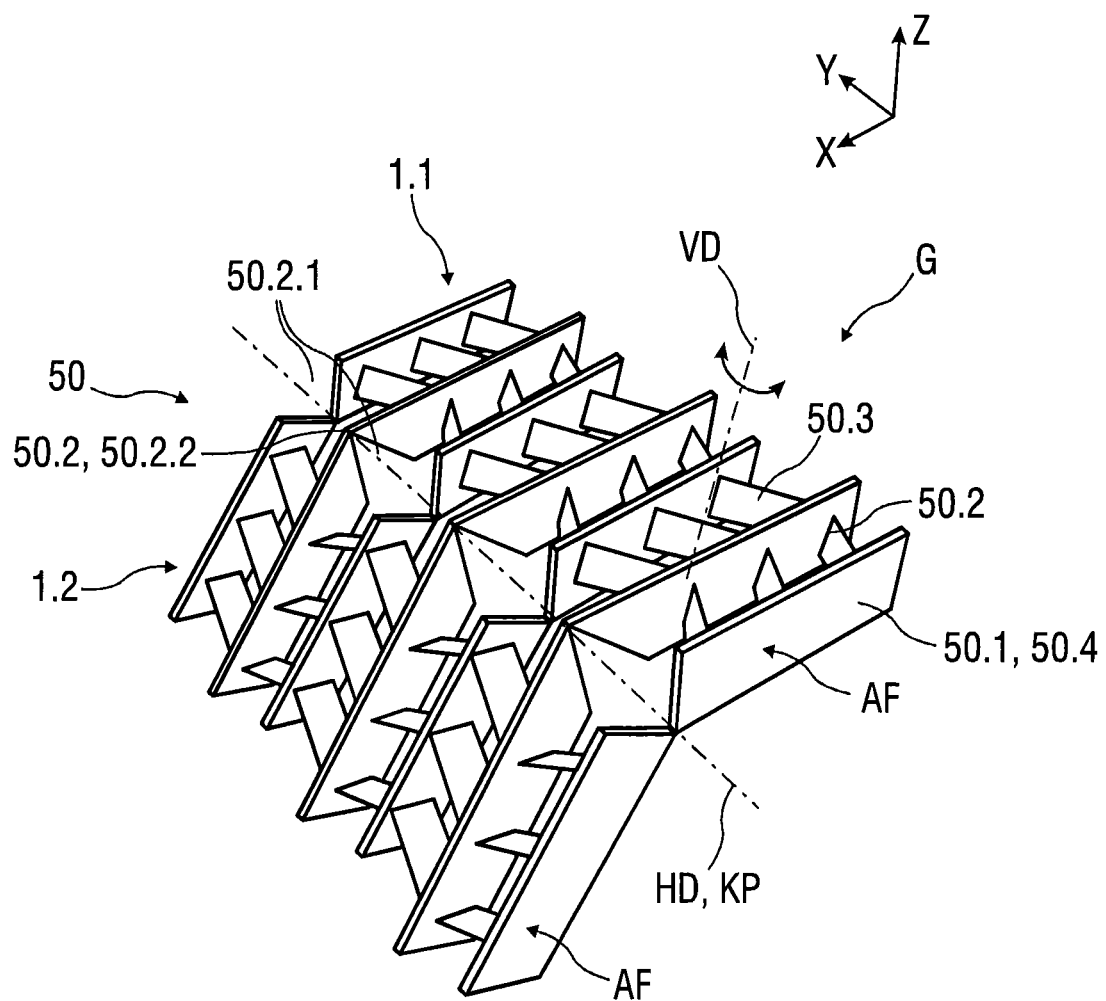
FIG. 10 shows, schematically in a perspective illustration, an embodiment of a flexible structure for a structural component in the region of a pivot point or collapsing point between two structural regions which are pivotable relative to each other.

FIGS. 8 to 10 show, schematically in a perspective illustration, an embodiment of a flexible structure 50 for a structural component 1 having a pivot point or buckling point KP between two structural regions 1.1 and 1.2 which are pivotable or inclinable relative to each other about the buckling point KP.

The flexible structure 50 comprises a plurality of links 50.1, joints 50.2 and/or lever elements 50.3 which are connected to one another in a row R0 and/or in parallel in order, in at least one, in particular in at least two or more degrees of freedom F1 and F2, to compress or to expand.

In particular, the kinetic structural component 1 can be formed as a monolith from the inner flexible structure 50. The flexible structure 50 is, for example, a flexibles grid G having lever elements 50.3 which are articulated on the longitudinal elements 50.4 by joints 50.2 having a horizontal axis of rotation HD in the region of the buckling point KP and having a vertical axis of rotation VD in the region of the articulation of the lever elements 50.3.

The flexible structure 50 here can be formed from a constantly recurring mechanical lever element 50.3, wherein the lever elements 50.3 are connected to form a grid G which expands or compresses in a linear manner.

The lever elements 50.3 are arranged, for example, in a diamond-shaped manner. In particular, the constantly recurring lever element 50.3 is arranged between longitudinal elements 50.4 in such a manner that the grid G comprises diamonds R which are mirrored with respect to one another along the longitudinal elements 50.4 and change their shape and move, in particular expand in a linear manner or compress in a linear manner, depending on an acting and controlled force. The respective diamond R is formed here by parallel and spaced-apart longitudinal elements 50.4 which are connected to one another by the lever elements 50.3, for example planar webs, which are articulated on the longitudinal elements 50.4. The recurring lever elements 50.3 between the longitudinal elements 50.4 form parallel and serial kinematics, as a result of which the structural component 1 expands in a linear manner or compresses in a linear manner.

The one end of the respective lever element 50.3 or of the respective web of diamonds R mirrored with respect to one another is connected toward the center to a central, controllable longitudinal element 50.4.1 or a central part, in particular a control part. The controllable longitudinal element 50.4.1 forms the mirror axis of the diamonds R which are mirrored with respect to one another.

The opposite end of the respective lever element 50.3 of diamonds R which are mirrored with respect to one another is connected to an outer longitudinal element 50.4.2 or to a diamond outer surface which, in turn, is connected to the next lever element 50.3 or forms an outer surface AF of the grid G, and therefore the flexible structure 5.

The ends of the lever element 50.3 are articulated here on the respective longitudinal element 50.4. For this purpose, joints 50.2 are provided at each end of the lever element 50.3. Said joints 50.2 are, for example, solid-state joints 50.2.2 which are formed monolithically with the longitudinal elements 50.4, for example by a tapering or notch 50.2.1. The lever elements 50.3 are pivotable or rotatable relative to the respective longitudinal element 50.4 about a vertical axis of rotation VD by the joint 50.2.

Since the diamond outer surfaces of the lever elements 50.3, i.e. the outer longitudinal elements 50.4.2 of a diamond R, expand in a linear manner, a plurality of diamonds R can be connected to their outer longitudinal elements 50.4.2 to form an expanding grid G. The diamonds R can be arranged next to one another in a row and in a transverse extent in the longitudinal extent of the structural component 1.

If the grid G, and therefore the flexible structure 50, expands, the controllable longitudinal elements 50.4.1 and therefore the respective central parts of the diamonds R move 90° for the expansion. If the movement of the central parts is activated, the entire grid G, and therefore the flexible structure 50, expands or compresses.

The diamonds R, and therefore the grid G, can be scaled as desired, and therefore it is possible to adapt the expansion or compression and the stability to the desired use or the desired application of the structural component 1. The flexible structure 50 is therefore usable not only as part of a seat S, but also for other components, such as panels and arm rests.

If the structural component 1 having the inner and previously described flexible structure 50 is used for a seat S, in particular a vehicle seat or aircraft seat, the entire seat S is formed from a monolithic flexible structure 50 having structural regions 1.1, 1.2, for example for a seat part 3 and a foot support 4, and therefore the expansion or compression of the monolithic flexible structure 50 and thus an adjustment of the seat S into a desired position P1 to P3 can be controlled by a movement of the foot support 4 with respect to the seat part 3 (illustrated in FIGS. 2 to 4) and/or of the back rest 2 with respect to the seat part 3.

If, for example, the foot support 4 (also called foot rest or foot extension) is moved with respect to the seat part 3 (also called seat cushion or seat surface) form the position P1, for example a sitting position with the foot support 4 arranged at an angle of 90 degrees with respect to the seat part 3, the flexible structure 50 is expanded. That is to say, the diamonds R are completely expanded and opened, as illustrated in FIG. 8.

Figure 11:
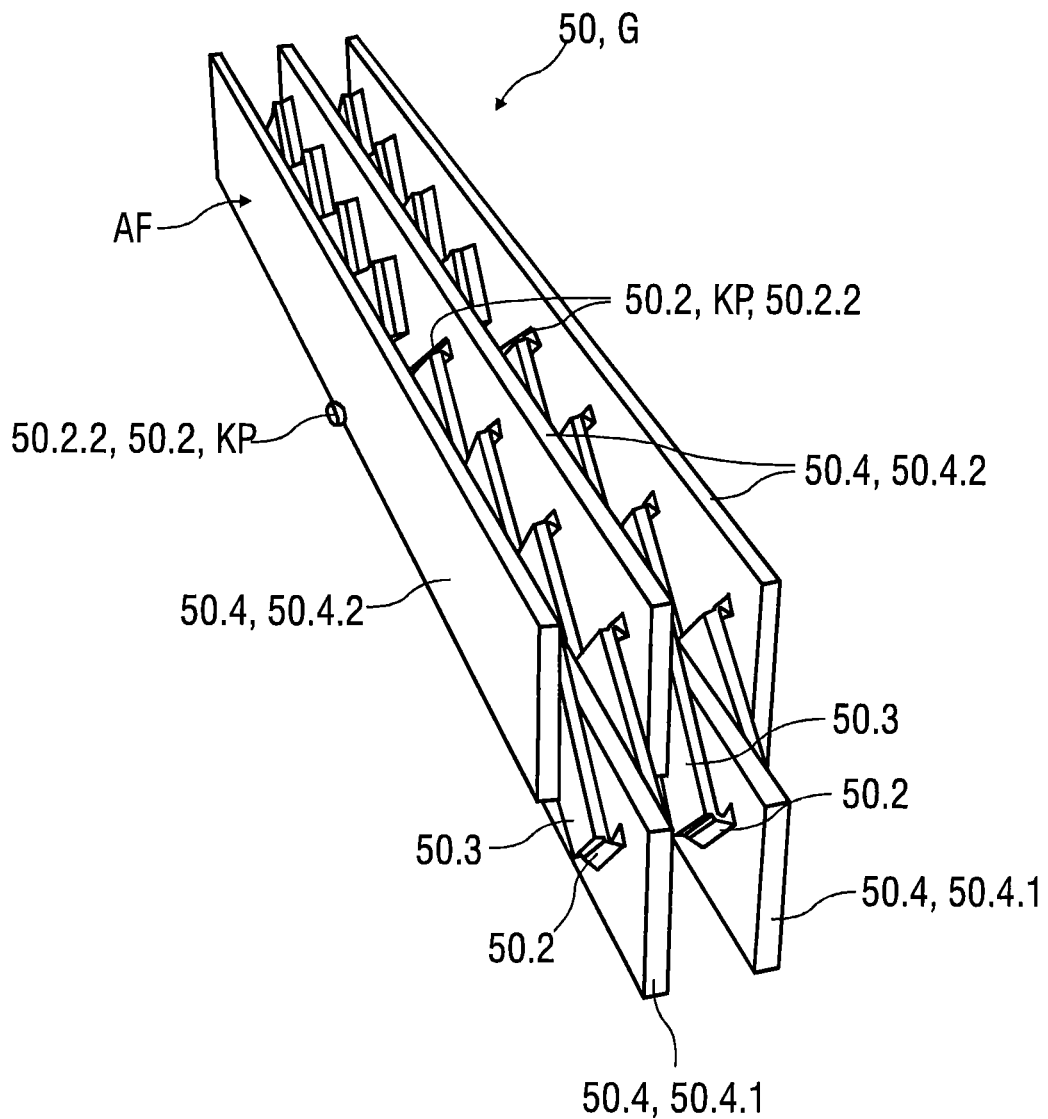
FIG. 11 shows, schematically in a perspective illustration, an embodiment of a flexible structure in the compressed state.
Figure 12:
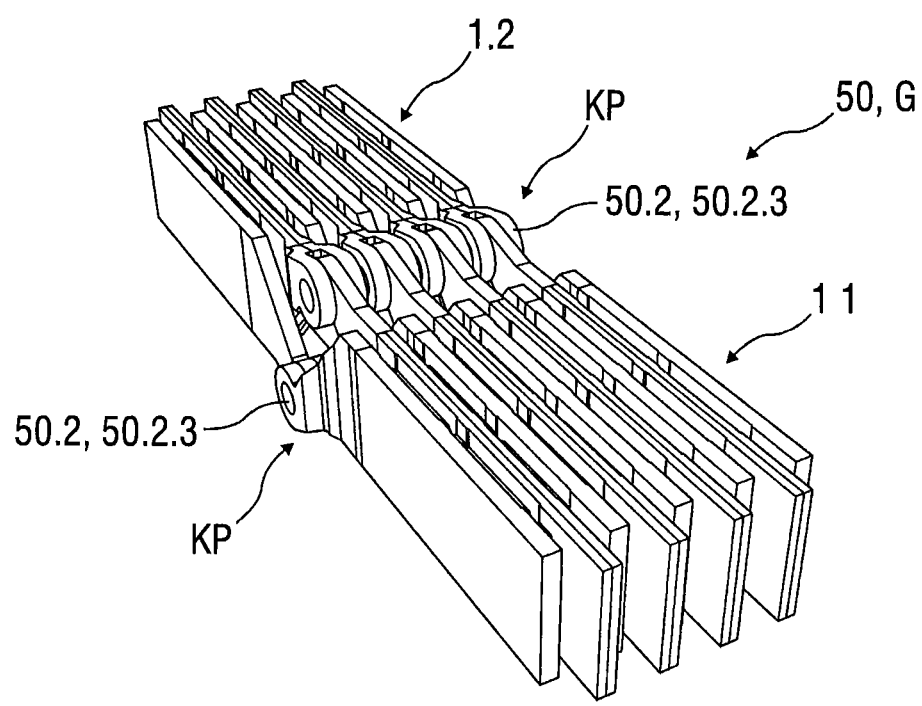
FIG. 12 shows, schematically in a perspective illustration, an embodiment of a flexible structure in the compressed state.
Figure 13A:
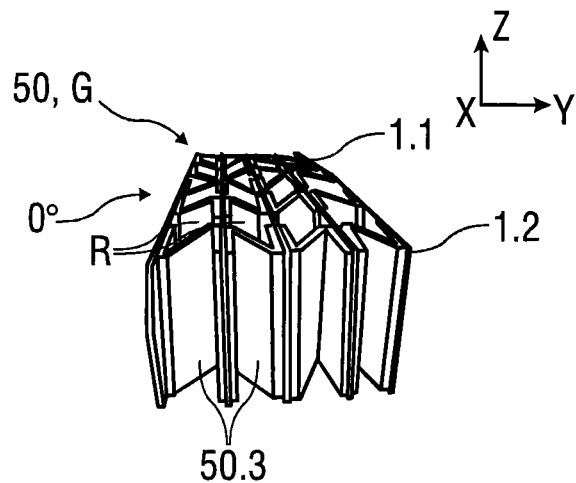
FIG. 13A shows, schematically, a sequence of perspective illustrations of the flexible structure during an expansion movement.
Figure 13B:
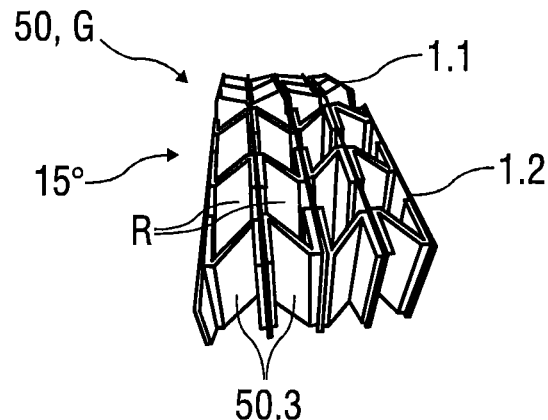
FIG. 13B shows, schematically, a sequence of perspective illustrations of the flexible structure during an expansion movement.
Figure 13C:
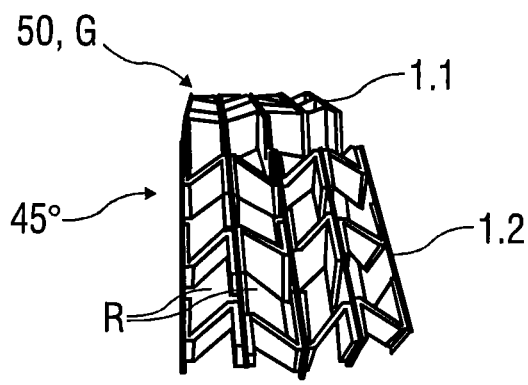
FIG. 13C shows, schematically, a sequence of perspective illustrations of the flexible structure during an expansion movement.
Figure 13D:
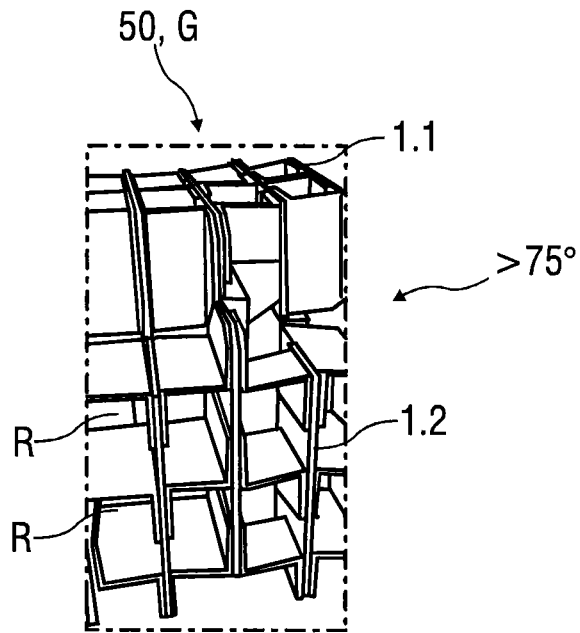
FIG. 13D shows, schematically, a sequence of perspective illustrations of the flexible structure during an expansion movement.
Figure 13E:
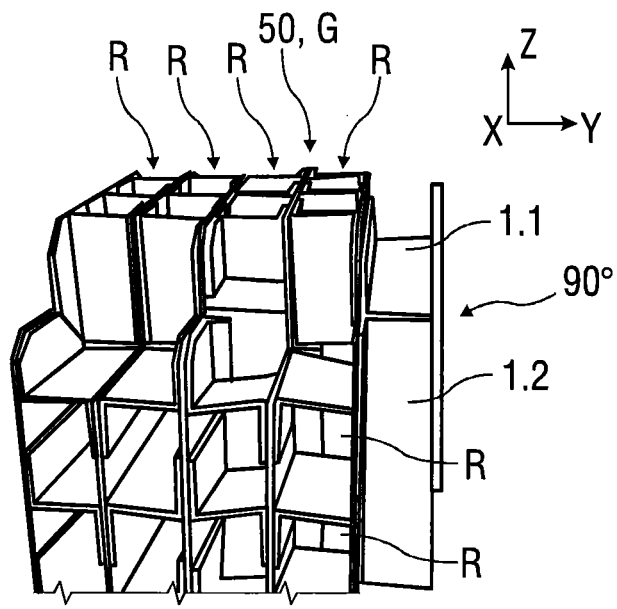
FIG. 13E shows, schematically, a sequence of perspective illustrations of the flexible structure during an expansion movement.

Conversely, if the flexible structure 50 is placed into the position P2 or P3, a comfortable sitting position or lying position, in which the foot support 4 is arranged at an angle 45° with respect to the seat part 3 or in a plane or at an angle of 0°, the flexible structure 50 compresses. That is to say, the diamonds R are partially compressed and closed, as illustrated in FIGS. 9 to 10. The diamonds R are completely closed when the flexible structure 50 forms a continuous flat surface, as is illustrated in FIGS. 11 and 12.

The respective longitudinal element 50.4, in particular the controllable longitudinal element 50.4.1, but also the outer longitudinal elements 50.4.2 are divided in order to form the buckling point KP for the structural component 1. In other words: the longitudinal elements 50.4 form longitudinal levers. In the region of the buckling point KP, the respective longitudinal element 50.4 has a joint 50.2, in particular a solid-state joint. The joint 50.2 has, for example, a tapering or notch 50.2.1 on one side in order, in the buckling point KP, to form a horizontal axis of rotation HD which runs perpendicularly to the longitudinal extent of the respective longitudinal element 50.4.

For example, the longitudinal elements 50.4 in the structural component 1 for the seat S are divided in the transition region between back rest 2 and seat part 3 or between seat part 3 and foot support 4 and are provided with an associated joint 50.2, for example a solid-state joint.

If the longitudinal levers or longitudinal elements 50.4 of the diamonds R are each arranged against one another at the buckling point KP, the path which the horizontal axis of rotation HD defines can allow the flexible structure 50 to expand or compress. The linearly expanding part, in particular the outer longitudinal elements 50.4.2 of the diamonds R and of the grid G, has its buckling point KP closer to the actual horizontal axis of rotation HD of the flexible structure 50.

The controllable longitudinal element 50.4.1 has its pivot point or buckling point KP further away from the horizontal axis of rotation HD. This has the result that the expansion of the flexible structure 50, and therefore of the grid G, interacts with the movement of the foot support 4 relative to the seat part 3.

In order to control the controllable longitudinal element 50.4.1, a separate drive 9 can be provided in order to correspondingly control the movement of the controllable longitudinal element 50.4.1 and, as a result, the expansion or compression of the flexible structure 50.

FIGS. 11 and 12 show, schematically in a perspective illustration, the flexible structure 50 in the compressed state in which the flexible structure 50 forms a substantially continuous flat surface. The diamonds R are substantially closed, and the lever elements 50.3 which are mounted in an articulated manner are arranged substantially parallel to the longitudinal elements 50.4.

In FIG. 11, the joints 50.2 having a horizontal axis of rotation HD at the buckling point KP are designed as solid-state joints 50.2.2 having notches 50.2.1. In FIG. 12, the joints 50.2 at the respective buckling point KP are designed as conventional rotary joints 50.2.3.

FIGS. 13A to 13E show, schematically, a sequence of perspective illustrations of the flexible structure 50 during an expansion movement from a completely compressed state of the diamonds R, in which the structural regions 1.1 and 1.2 form a substantially flat surface, into a completely expanded state of the diamonds R, in which the structural regions 1.1 and 1.2 are arranged at an angle of 90° with respect to one another.

Figure 14A:
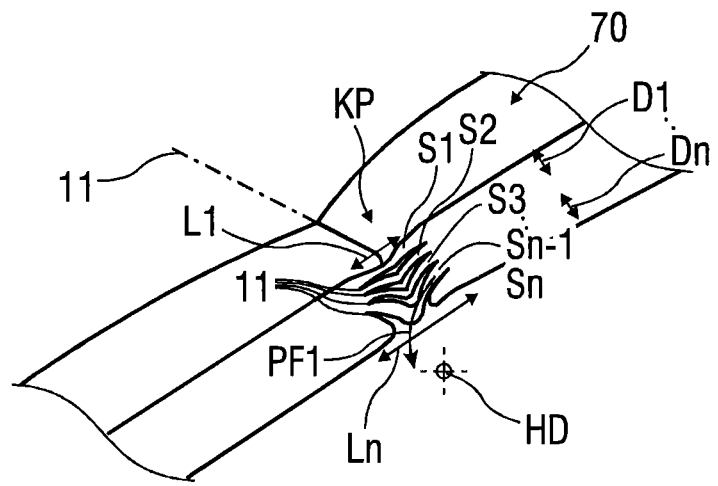
FIG. 14A shows, schematically in a sectional illustration, an embodiment for padding with divided layers in the collapsing point region.
Figure 14B:
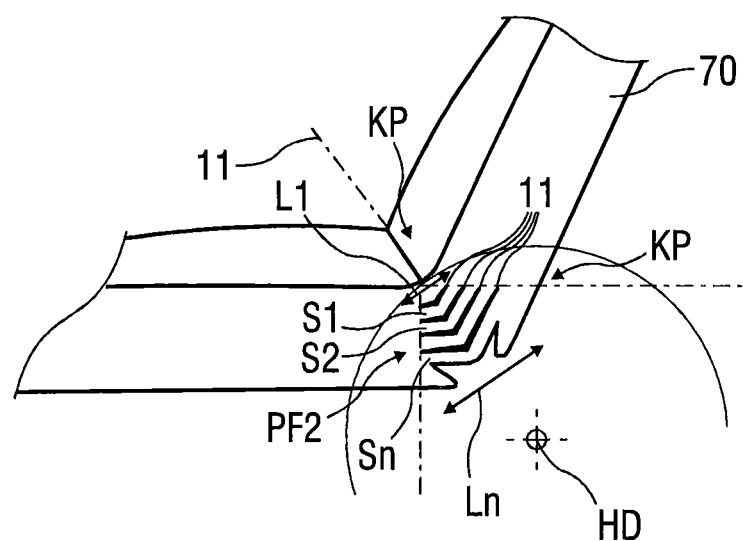
FIG. 14B shows, schematically in a sectional illustration, an embodiment for padding with divided layers in the collapsing point region.

FIGS. 14A to 14B show, schematically in a sectional illustration, an embodiment of the padding 70.

The padding 70 is divided in the region of a bending point or buckling point KP into a plurality of layers S1 to Sn.

The layers S1 to Sn at the buckling point region are formed, for example, by through openings 11 which are introduced into the padding 70 and extend through the padding 70 transversely with respect to the longitudinal extent thereof and parallel to a buckling line 10 of the padding 70. The through openings 11 are of slot-shaped design.

The layers S1 to Sn are separated from one another in the region of the buckling point KP by the through openings 11. In other words: the layers S1 to Sn are not connected to one another in the region of the buckling point KP. This makes it possible in a simple manner for the respective layer S1 to Sn to be able to expand or compress about its respective length during the bending or buckling of the padding 70 at the buckling point KP. The compression of the respective layer S1 to Sn takes place away from the buckling point KP, as is illustrated by an arrow PF 1 in FIG. 14A.

The expansion of the respective layer S1 to Sn takes place toward the buckling point KP according to arrow PF2, as is illustrated in FIG. 14B. The expansion and the compression do not have any influence here on the padding surface.

Furthermore, the layers S1 to Sn can differ in their length L1 to Ln in the longitudinal extent of the padding 70 and therefore transversely with respect to the buckling line 10. For example, the layer Sn furthest away from the buckling point KP and therefore from the buckling line 10 has the greatest length Ln in longitudinal extent. The length Ln−1 to L1 of each further layer Sn−1 to S1 is shortened as far as the buckling point KP. The size of the respective length L1 to Ln of the layers S1 to Sn can additionally depend on the thickness D1 to Dn of the respective layer S1 to Sn. Alternatively, all of the layers S1 to Sn can be identical in thickness. In a further embodiment, all of the layers S1 to Sn have the same width which is in particular identical to the width of the padding 70.

Furthermore, the horizontal axis of rotation HD of the padding 70 can be shifted onto the surface of the padding. There is thus neither excessive compaction or excessive expansion of the foam of the padding 70 or of a cover element 8 arranged on the padding 70.

Such a configuration of the padding 70 with a plurality of layers S1 to Sn in the region of the buckling point makes it possible in a simple manner for said layers S1 to Sn to be able to expand, during bending of the padding 70, without having an effect on the surface of the padding 70. In particular in the case of a foam padding having a plurality of divided layers S1 to Sn in the region of the buckling point, the foam is not compacted or compressed at the buckling point KP. On the contrary, the individual layers S1 to Sn are moved or shifted such that the padding surface and/or the cover element 8 is or are not arched or folded and the comfort is improved. Bending or buckling of the padding 70 is thus possible independently of the horizontal axis of rotation HD and without compression or compaction.

Figure 15A:
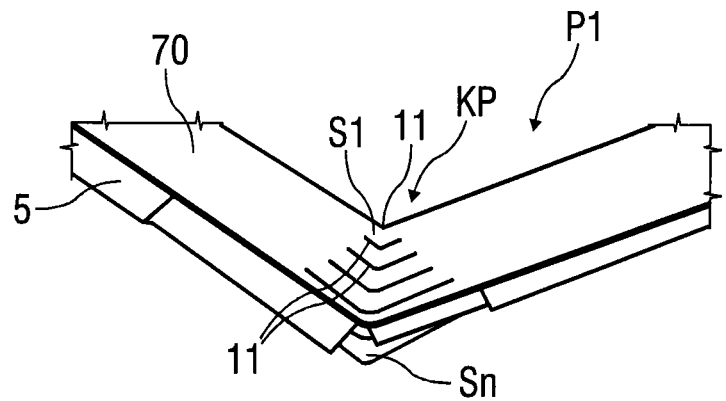
FIG. 15A shows, schematically in a side view, the structural component having padding in the collapsing point region and in various positions.
Figure 15B:
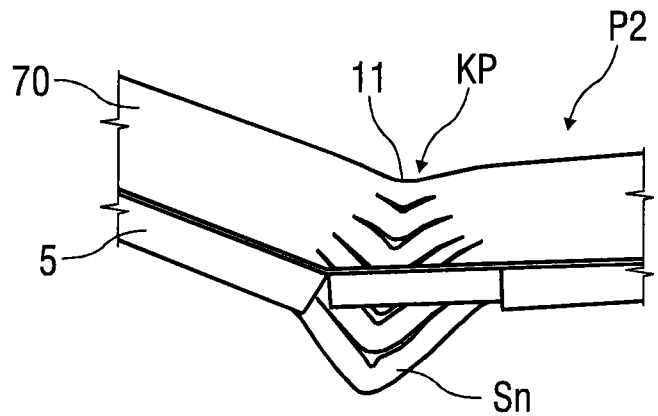
FIG. 15B shows, schematically in a side view, the structural component having padding in the collapsing point region and in various positions.
Figure 15C:
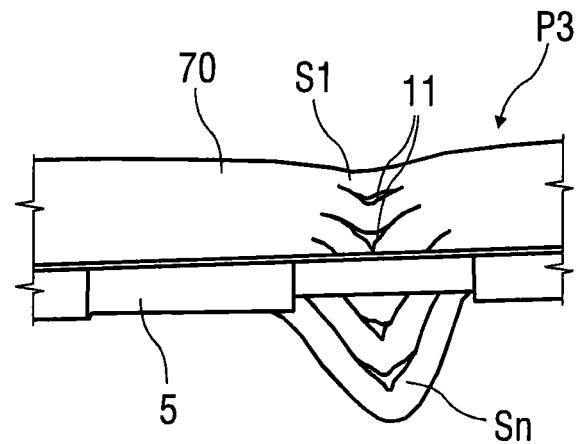
FIG. 15C shows, schematically in a side view, the structural component having padding in the collapsing point region and in various positions.

FIGS. 15A to 15C show, schematically in a side view, the structural component 5 having the padding 700 in various positions P1 to P3. In the region of the buckling point KP, the padding 700 has the above-described layers S1 to Sn which are separated from one another by through openings 11.

Figure 16A:
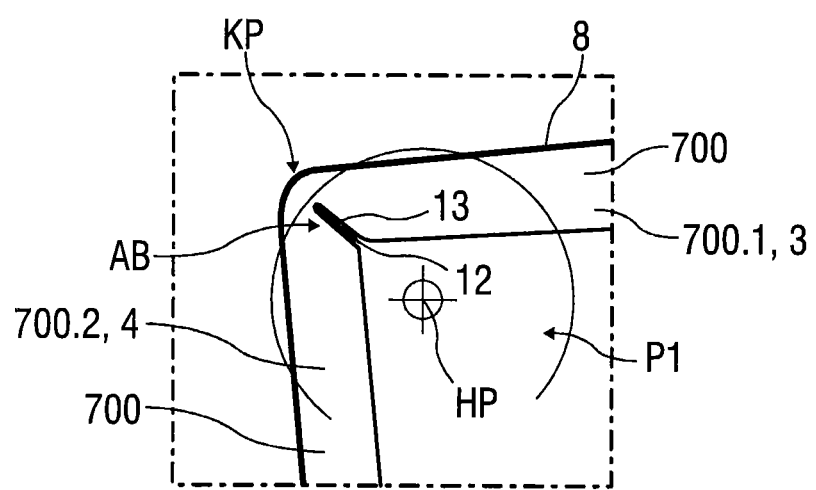
FIG. 16A shows, schematically in a sectional illustration, an embodiment of padding having a wedge-shaped recess and a lever structure in the collapsing point region.
Figure 16B:
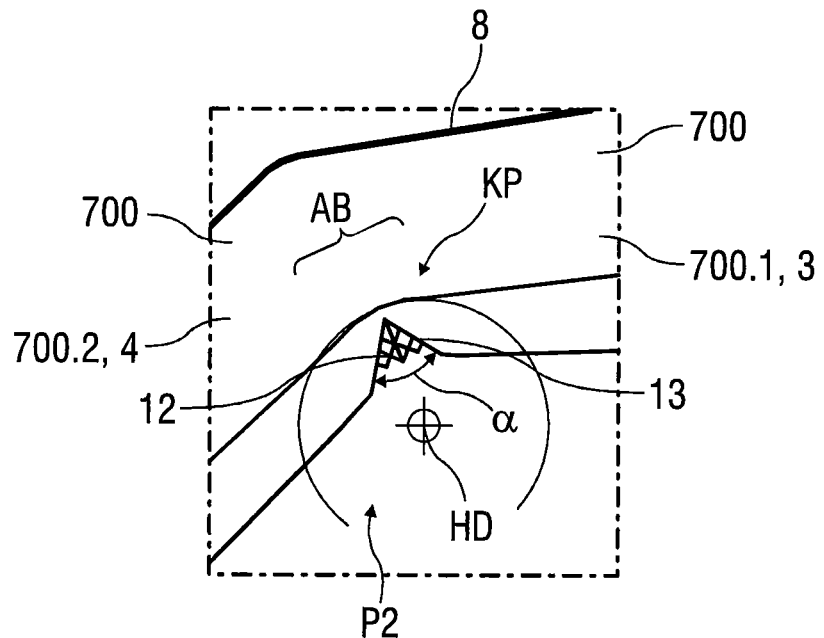
FIG. 16B shows, schematically in a sectional illustration, an embodiment of padding having a wedge-shaped recess and a lever structure in the collapsing point region.
Figure 16C:
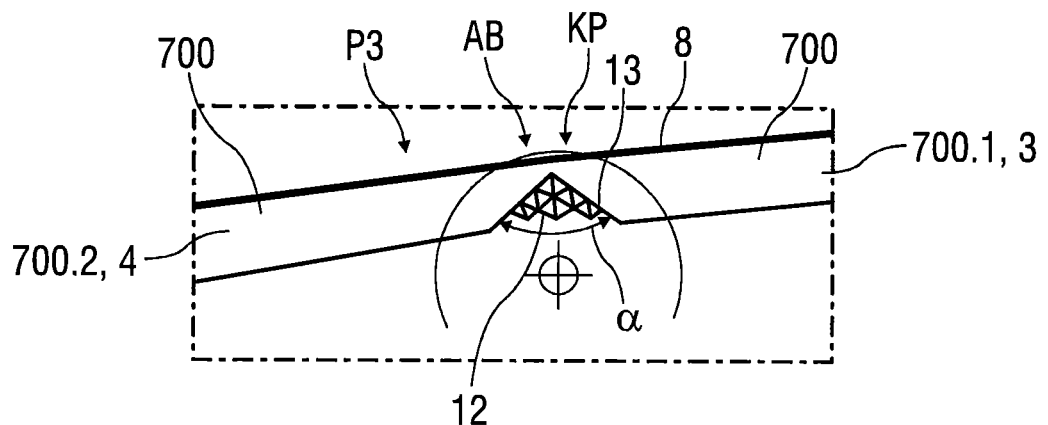
FIG. 16C shows, schematically in a sectional illustration, an embodiment of padding having a wedge-shaped recess and a lever structure in the collapsing point region.

FIGS. 16A to 16C show, schematically in each case in a side view, an embodiment of the padding 700 in the various positions P1 to P3.

In the region of a bending or buckling point KP, the padding 700 has a wedge-shaped recess 13 in which a flexible lever structure 12 is arranged.

FIG. 16A shows the padding 700 in the position P1 of a sitting position of the seat S. The flexible lever structure 12 is compressed.

The padding 700 is in particular designed as a single part and has, for example, a padding region 7.1 for the seat part 3 and an adjacent padding region 7.2 for the foot support 4. The two mutually adjacent padding regions 7.1 and 7.2 are movable, in particular inclinable or bucklable, in the adjacent region AB relative to each other about the buckling point KP. The buckling point KP of the padding 700 lies here in particular in the knee region of a user.

In this case, a severe overexpansion of the padding 700, in particular of the foam of the padding 700, and of the cover element 8, occurs in the knee region, and thus in the adjacent region AB between the two padding regions 7.1 and 7.2, because of the thickness of the padding 700, if the mutually adjacent padding regions 700.1 and 700.2 are arranged with respect to each other at an angle α of, for example, about 90° in position P1, a sitting position of the seat S. Furthermore, too large a radius can occur in the knee region because of the foam thickness.

In order to obtain the stability and statics of the padding 700 in the region of the buckling point, the lever structure 12, in particular a plastics lever, is integrated in the region of the wedge-shaped recess 13, for example is arranged on the inside or resting thereon, in order to support the relative movement of the padding regions 700.1, 700.2. FIGS. 16A to 16C and 17A to 17B show a resting arrangement of the lever structure 12 in the wedge-shaped recess 13, which is open on one side, of the padding 700.

Figure 18A:
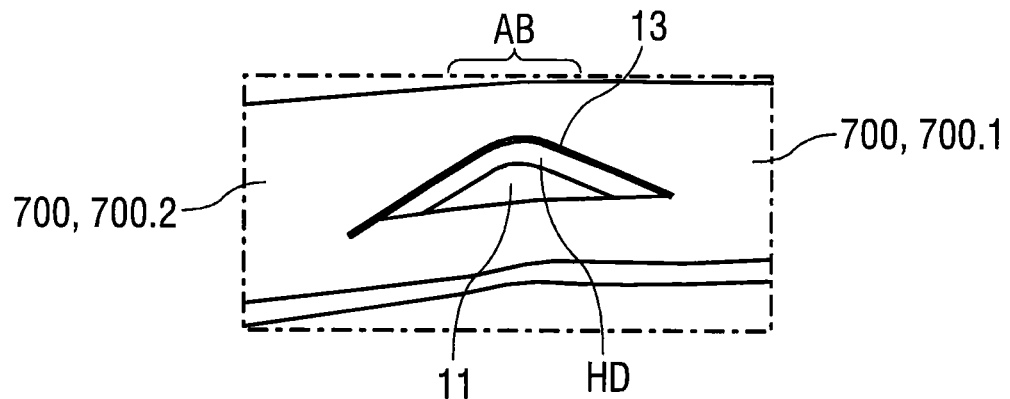
FIG. 18A shows, schematically in a side view, an embodiment of padding having an inner wedge-shaped recess and a triangular lever structure in the buckling point region.
Figure 18B:
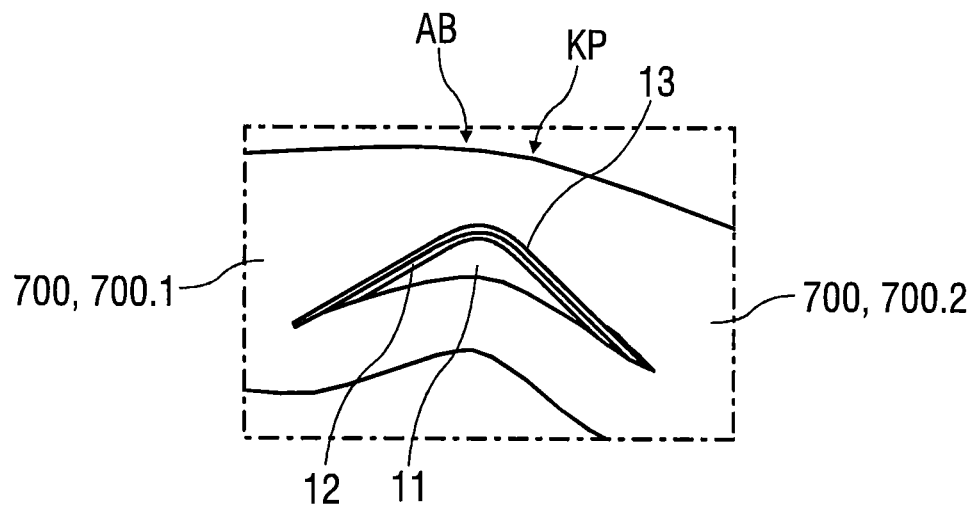
FIG. 18B shows, schematically in a side view, an embodiment of padding having an inner wedge-shaped recess and a triangular lever structure in the buckling point region.
Figure 18C:
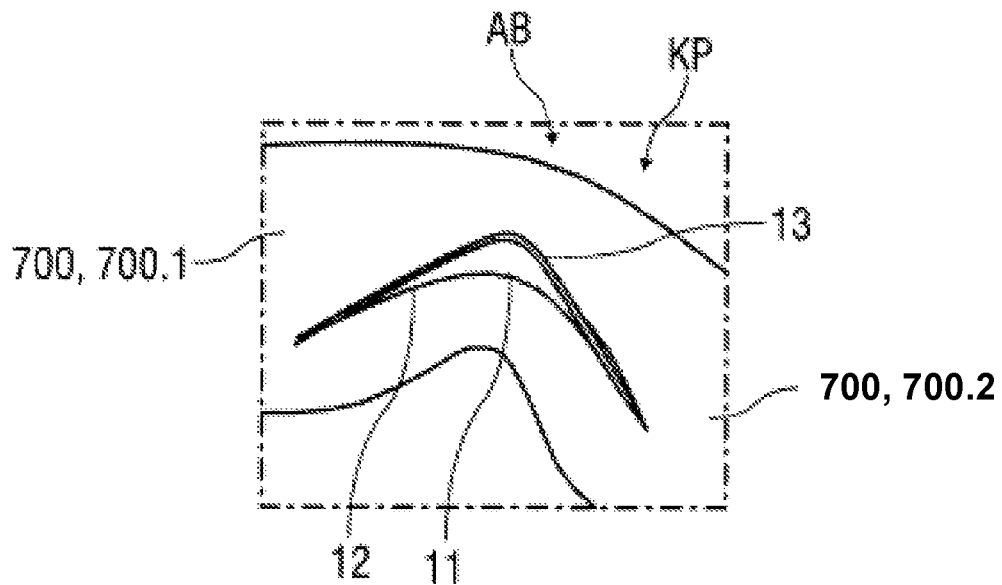
FIG. 18C shows, schematically in a side view, an embodiment of padding having an inner wedge-shaped recess and a triangular lever structure in the buckling point region.
Figure 18D:
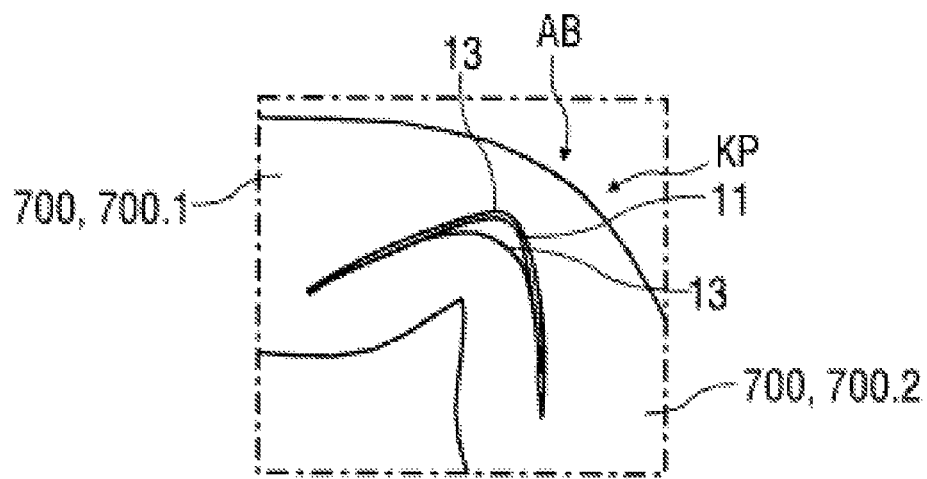
FIG. 18D shows, schematically in a side view, an embodiment of padding having an inner wedge-shaped recess and a triangular lever structure in the buckling point region.
Figure 18E:
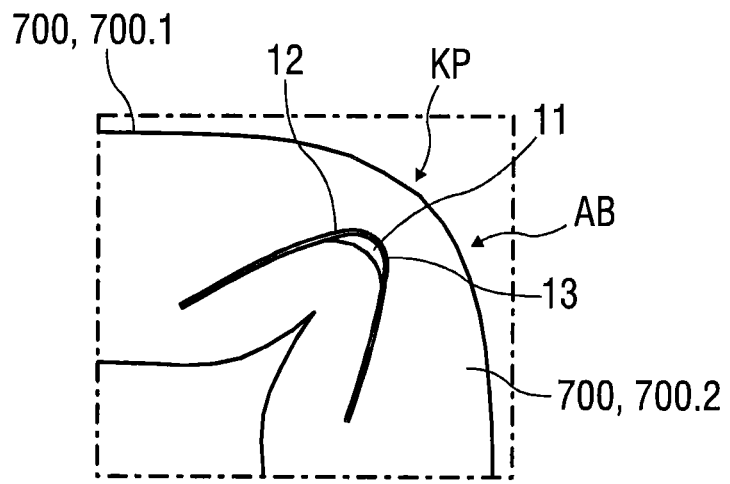
FIG. 18E shows, schematically in a side view, an embodiment of padding having an inner wedge-shaped recess and a triangular lever structure in the buckling point region.
Figure 19:
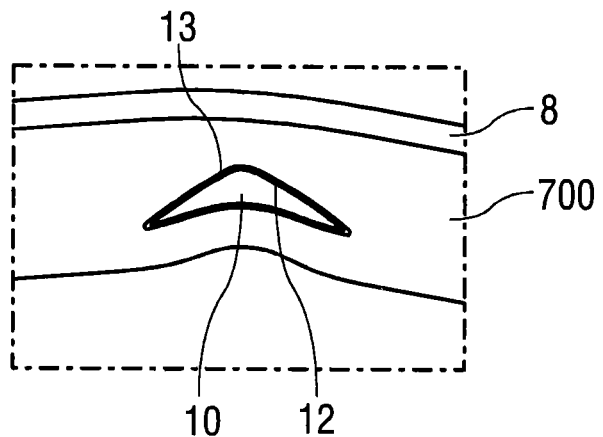
FIG. 19 shows, schematically in a side view, an embodiment of padding having a wedge-shaped recess and a lever structure in the collapsing point region and having a cover element on the padding.

FIGS. 18A to 19 show an inside arrangement of the lever structure 12 in a through opening 11 of the padding 700.

In position P1, the lever structure 12 specifies the buckling point KP for the padding 700, a padded cushion, in particular foam cushion, and shifts the horizontal axis of rotation HD of the flexible structure 5 as close as possible to the surface.

In order to counteract this, the padding 700 has, below the buckling point KP, the wedge-shaped recess 13 which is illustrated partially open in FIG. 16B and completely open in FIG. 16C. In these positions P2 and P3, the level structure 12 is partially or completely stretched or expanded, as a result of which the padding 700, in particular the foam, very substantially maintains its shape and at the same time is stabilized in a tensile direction.

For this purpose, the flexible lever structure 12 is formed from a flexible plastics material, for example from polypropylene.

In FIG. 16B, the adjacent padding regions 700.1 and 700.2 are arranged at an angle α of greater than 90° with respect to each other and are thus located in position P2, an inclined sitting position of the seat S. The flexible lever structure 12 is partially expanded or stretched and the wedge-shaped recess 13 is correspondingly partially open.

In FIG. 16C, the adjacent padding regions 700.1 and 700.2 are arranged at an angle α of circa 180° with respect to each other and are thus located in position P3, a lying position or bed position of the seat S, and form a flat surface. The flexible lever structure 12 is completely expanded and the wedge-shaped recess 13 is correspondingly completely open.

The size of the wedge-shaped recess 13 and the angle α thereof thus change relative to the movement of the padding region 700.2 for the foot support 4 and relative to the padding region 700.1 for the seat part 3.

The flexible lever structure 12 is formed, for example, in a grid-shaped manner (FIGS. 16A to 16C), in a diamond-shaped manner (FIGS. 17A to 17B) or in a wing-shaped manner from a plurality of links, joints and levers. The joints are in particular solid-state joints. In position P1, in which the flexible lever structure 12 is compressed, the links and levers of the lever structure 12 lie parallel next to one another, as illustrated in FIG. 16A. In positions P2 and P3, the flexible lever structure 12 is partially or completely stretched or expanded and the flexible grid is correspondingly open in order to support the region of the buckling point.

The wedge-shaped recess 13 can be introduced here into the padding 700 as a notch on one side, as shown in the exemplary embodiments in FIGS. 16A to 17B.

In a further embodiment, the parameters and properties of the padding 700, the flexible structure 5, the foam thickness, the design and the radii are freely scaleable and can be adapted.

The cover element 8 can be connected by separating openings, not illustrated specifically, in the padding 700 to the flexible structure 5 and held on the latter.

Figure 17A:
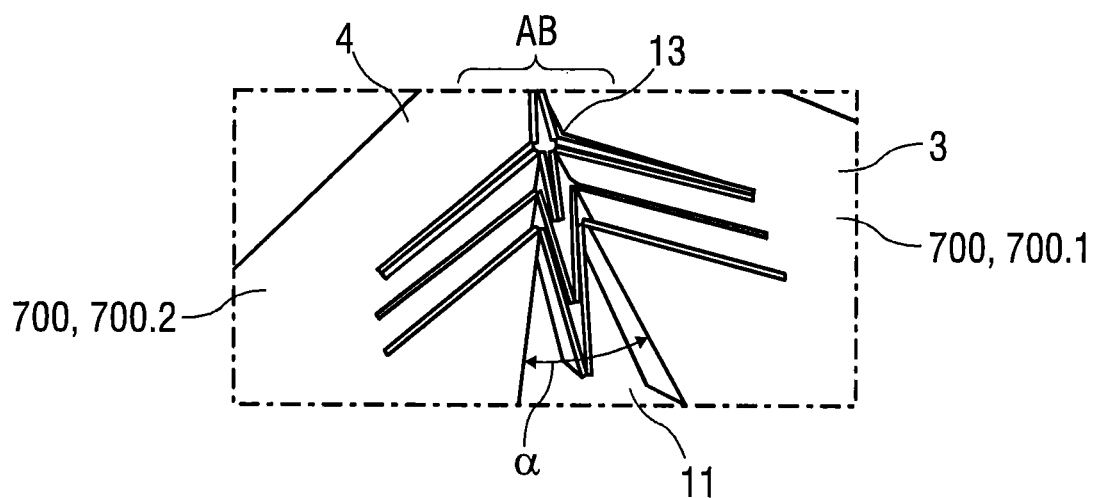
FIG. 17A shows, schematically in a side view, an embodiment for padding having a wedge-shaped recess in the form of a notch on one side and a rectangular lever structure in the collapsing point region.
Figure 17B:
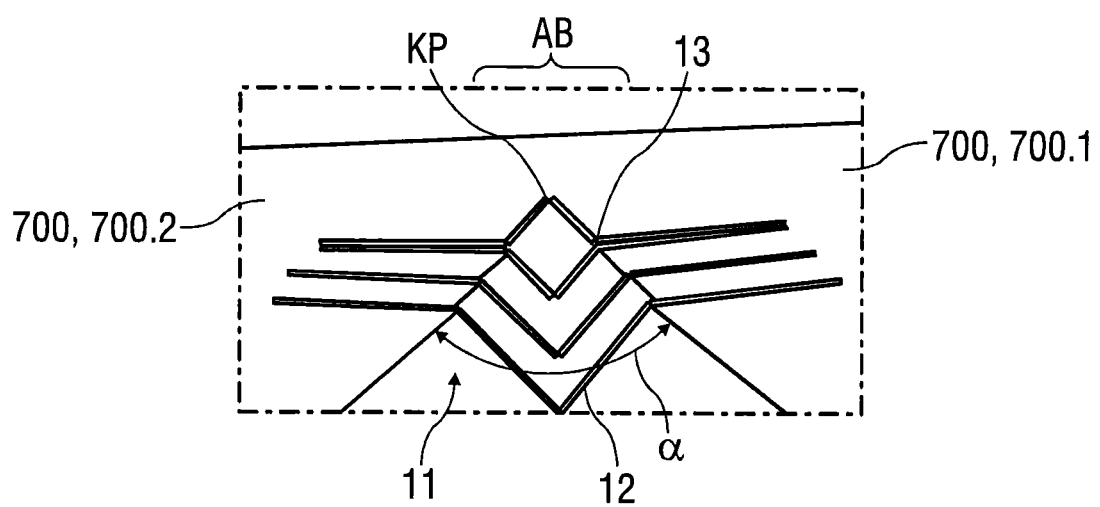
FIG. 17B shows, schematically in a side view, an embodiment for padding having a wedge-shaped recess in the form of a notch on one side and a rectangular lever structure in the collapsing point region.

FIGS. 17A and 17B show, schematically in a side view, an embodiment of the padding 700 with a wedge-shaped recess 13 in the form of a notch on one side and a rectangular, in particular diamond-shaped lever structure 12 in the region of the buckling point in the partially compressed state or stretched or expanded state.

FIGS. 18A to 18E show, schematically in a side view, an embodiment of a padding 700 with an inner wedge-shaped recess 13 and a triangular lever structure 12 in the region of the buckling point in the various positions P1 to P3 with a completely compressed lever structure 12 (FIG. 18A) up to the completely extended or expanded lever structure 12 (FIG. 18E). The wedge-shaped recess 13 is introduced here as a through opening 11 with a triangular cross section into the padding 700 in the region of the buckling point. The lever structure 12 is designed as a flat single bending lever, for example a spring or metal strip.

FIG. 19 shows, schematically in a side view, the padding 700 with the inner wedge-shaped recess 13 and the lever structure 12 in the region of the buckling point, and with the cover element 8 on the padding 700.

FIGS. 20 to 23 show, schematically in various illustrations, a further exemplary embodiment of a flexible structure 500 for a structural component 1 with a pivoting point or buckling point KP between two structural regions 1.1 and 1.2 which are pivotable or inclinable relative to each other about the buckling point KP.

The flexible structure 500 comprises a plurality of links 500.1, joints 500.2 and/or lever elements 500.3 which are coupled to one another in terms of movement in order to compress or to expand in at least one, in particular in at least two or more degrees of freedom F1, F2, R1 and/or R2.

In particular, the kinetic structural component 1 can be formed as a monolith from the flexible structure 500. The flexible structure 500 is, for example, a flexible grid G with lever elements 500.3 which are articulated by joints 500.2 having a horizontal axis of rotation HD in the region of the buckling point KP and having a vertical axis of rotation VD or inclined axis of rotation D in the region of the articulation of the lever elements 500.3 on the links 500.1, in particular on longitudinal elements 500.4.

The flexible structure 500 can be formed here from a constantly recurring mechanical lever element 500.3, wherein the lever elements 500.3 are connected to form a grid G which expands or compresses linearly.

The lever elements 500.3 are arranged, for example, in a diamond-shaped manner. In particular, the constantly recurring lever element 500.3 is arranged between longitudinal elements 500.4 in such a manner that the grid G, in a partially or completely expanded position, along the longitudinal elements 500.4 forms mutually mirrored rectangles, in particular diamonds R, which change their shape and move, in particular expand in a linear manner or compress in a linear manner, depending on an acting and controlled force. The respective diamond R is formed here by parallel and spaced-apart longitudinal elements 500.4 which are connected to one another by the lever elements 500.3, for example planar webs, which are articulated on the longitudinal elements 500.4. The recurring lever elements 500.3 between the longitudinal elements 500.4 form parallel and serial kinematics, as a result of which the structural component 1 expands in a linear manner or compresses in a linear manner.

The one end of the respective lever element 500.3 or of the respective web of mutually mirrored diamonds R is connected towards the center to a central controllable longitudinal element 500.4.1 or to a central part, in particular a control part. The controllable longitudinal element 500.4.1 forms the mirror axis of the mutually mirrored diamonds R.

The opposite end of the respective lever element 500.3 of mutually mirrored diamonds R is connected to an outer longitudinal element 500.4.2 or to a diamond outer surface which, in turn, is connected to the next lever element 500.3 or forms an outer surface AF of the grid G, and thus the flexible structure 5.

The ends of the lever element 500.3 are articulated here on the respective longitudinal element 500.4. For this purpose, joints 500.2 are provided at each end of the lever element 500.3. Said joints 500.2 are, for example, solid-state joints 500.2.2 which are formed monolithically with the longitudinal elements 500.4, for example by a tapering or notch 500.2.1. The lever elements 500.3 are pivotable or rotatable relative to the respective longitudinal element 500.4 about a vertical axis of rotation VD or inclined axis of rotation D by the joint 500.2.

In particular in the buckling point KP, multi-part rotary joints 500.2.3 can also be provided as joints 500.2.

Since the diamond outer surfaces of the lever elements 500.3, i.e. the outer longitudinal elements 500.4.2 of a diamond R, expand in a linear manner, a plurality of diamonds R can be connected to their outer longitudinal elements 500.4.2 to form an expanding grid G. The diamonds R can be arranged here next to one another in a row and in transverse extent in the longitudinal extent of the structural component 1.

If the grid G, and thus the flexible structure 500, expands, the controllable longitudinal elements 500.4.1, and thus the respective central parts of the diamonds R, move 90° with the expansion. If the movement of the central parts is activated, the entire grid G, and thus the flexible structure 500, expands or compresses.

The diamonds R, and therefore the grid G can be scaled as desired, and therefore it is possible to adapt the expansion or compression and the stability to the desired use or the desired application of the structural component 1.

If the structural component 1 having the inner and previously described flexible structure 500 is used for a seat S, in particular a vehicle or aircraft seat, wherein the entire seat S is formed from a monolithic flexible structure 500 having structural regions 1.1, 1.2, for example for a seat part 3 and a foot support 4, the expansion or compression of the monolithic flexible structure 500, and therefore an adjustment of the seat S into a desired position P1 to P3, can thus be controlled by a movement of the foot support 4 with respect to the seat part 3 (illustrated in FIGS. 2 to 4), and/or of the back rest 2 with respect to the seat part 3.

Figure 20:
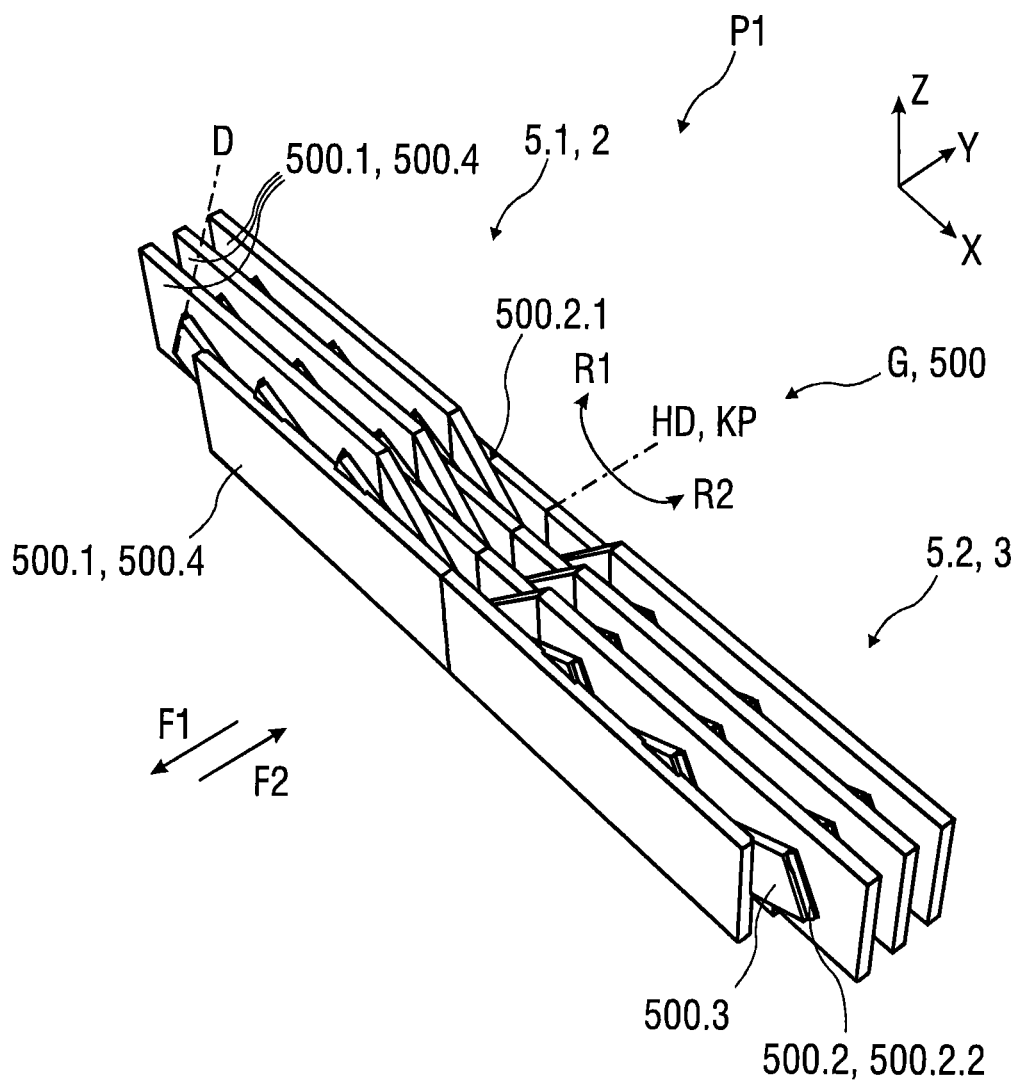
FIG. 20 shows, schematically in various views and positions, a further exemplary embodiment of a flexible structure of a structural component.

FIG. 20 shows, by way of example of position P1, a lying position in which the flexible structure 500 is compressed. The flexible structure 500 forms a substantially continuous flat surface. The diamonds R are substantially closed and the lever elements 500.3, which are mounted in an articulated manner, are arranged substantially parallel to the longitudinal elements 500.4.

Figure 21:
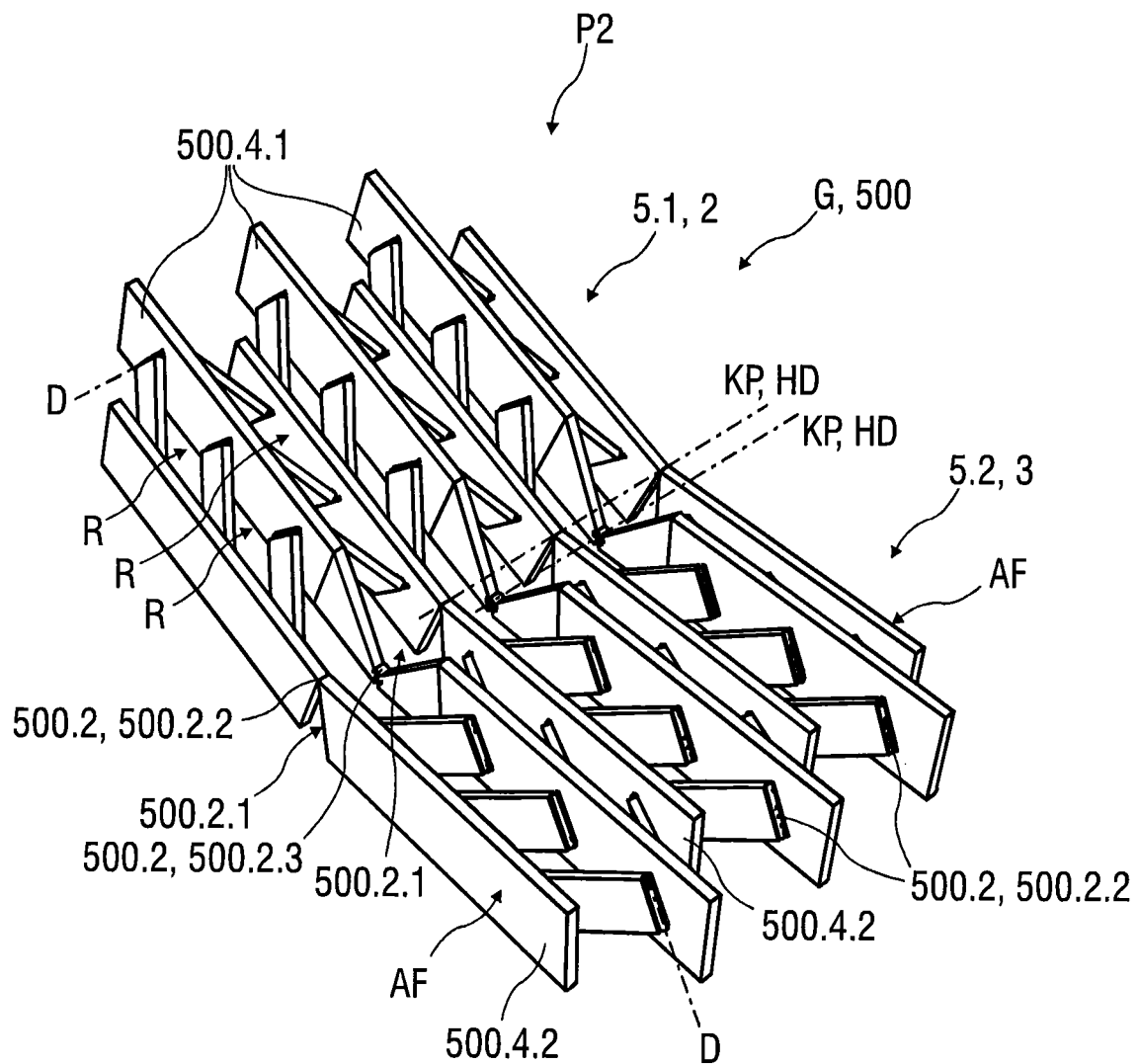
FIG. 21 shows, schematically in various views and positions, a further exemplary embodiment of a flexible structure of a structural component.
Figure 22:
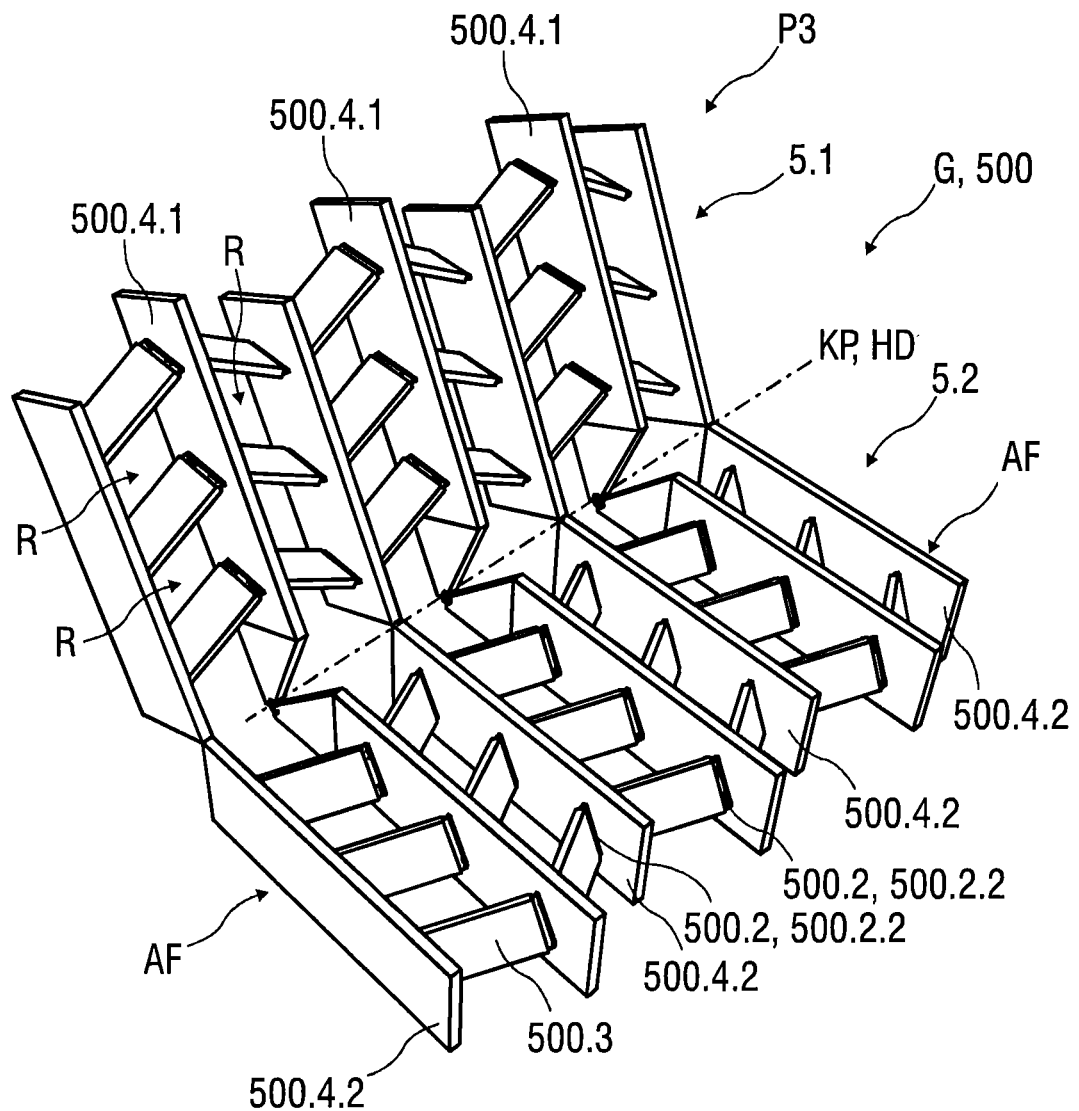
FIG. 22 shows, schematically in various views and positions, a further exemplary embodiment of a flexible structure of a structural component.
Figure 23:
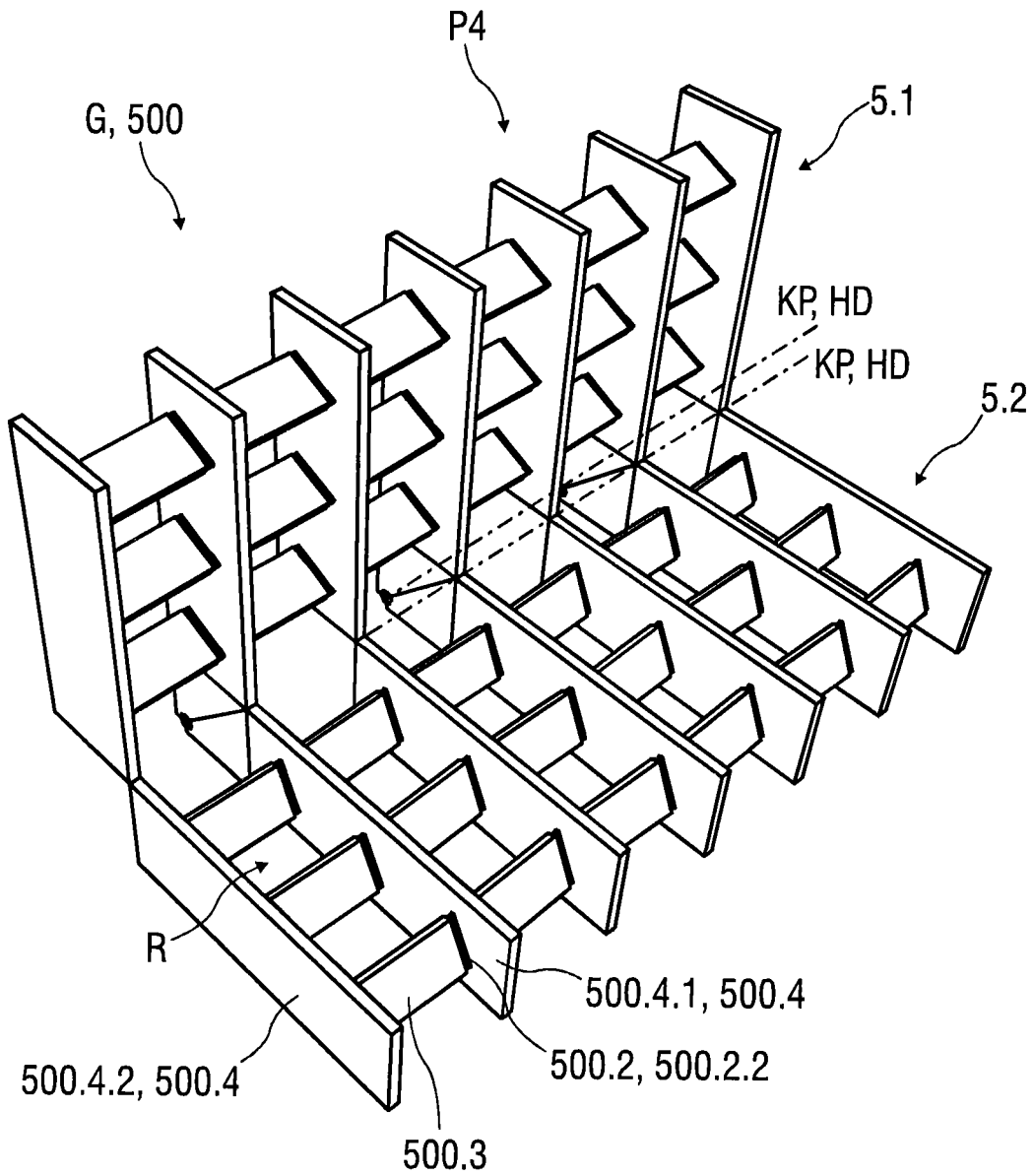
FIG. 23 shows, schematically in various views and positions, a further exemplary embodiment of a flexible structure of a structural component.

FIGS. 21 and 22 respectively show a partially expanded position P2 and P3 in which substructures 5.1, 5.2 of the flexible structure 500 are inclined relative to each other and more greatly inclined. FIG. 23 shows the flexible structure 500 in a completely expanded position and in a position P4 in which the substructures 5.1, 5.2 are arranged with respect to each other in an angular range of 85° to 90°. In particular in the case of a 90° arrangement of the substructures 5.1, 5.2 with respect to each other, the lever elements 500.3 are substantially perpendicular to the longitudinal elements 500.4.

The respective longitudinal element 500.4, in particular the controllable longitudinal element 500.4.1, but also the outer longitudinal elements 500.4.2 are divided in order to form the buckling point KP for the structural component 1. In other words: the longitudinal elements 500.4 form longitudinal levers. In the region of the buckling point KP, the respective longitudinal element 500.4 has a joint 500.2, in particular a solid-state joint. The joint 500.2 has, for example, a tapering or notch 500.2.1 on one side in order, at the buckling point KP, to form a horizontal axis of rotation HD which runs perpendicular to the longitudinal extent of the respective longitudinal element 500.4.

For example, the longitudinal elements 500.4, in the case of the structural component 1 for the seat S, are divided in the transition region between back rest 2 and seat part 3 or between seat part 3 and foot support 4, and provided with an associated joint 500.2, for example a solid-state joint 500.2.2.

If the longitudinal levers or longitudinal elements 500.4 of the diamonds R are each arranged against one another at the buckling point KP, the path that the horizontal axis of rotation HD defines can allow the flexible structure 500 to expand or compress. The linearly expanding part, in particular the outer longitudinal elements 500.4.2 of the diamonds R and of the grid G, has its buckling point KP closer to the actual horizontal axis of rotation HD of the flexible structure 500.

The controllable longitudinal element 500.4.1 has its pivot point or buckling point KP further away from the horizontal axis of rotation HD. This has the result that the expansion of the flexible structure 500, and therefore of the grid G, interacts with the movement of the foot support 4 with respect to the seat part 3.

In order to control the controllable longitudinal element 500.4.1, a separate drive 9 can be provided in order to correspondingly control the movement of the controllable longitudinal element 500.4.1 and, as a result, the expansion or compression of the flexible structure 500.

LIST OF DESIGNATIONS

1 Structural component
1.1, 1.2 Structural regions
1.3 Side flanks
1.4 Lumbar support
2 Back rest
3 Seat part
4 Foot support
5, 50, 500 Flexible structure
5.1, 5.2 Flexible substructure
5.3 Expansion element
5.4 Joint
50.1, 500.1 Link
50.2, 500.2 Joint
50.2.1, 500.2.1 Notch
50.2.2, 500.2.2 Solid-state joint
50.2.3, 500.2.3 Rotary joint
50.3, 500.3 Lever element
50.4, 500.4 Longitudinal element
50.4.1, 500.4.1 Controllable longitudinal element
50.4.2, 500.4.2 Outer longitudinal element
6 Surface element
6.1, 6.2 Flexible surface element
7, 70, 700 Padding
700.1, 700.2 Padding region
8 Cover element
9 Drive
10 Buckling line
11 Through opening
12 Lever structure
13 Wedge-shaped recess
A Covering
AB Adjacent region
AF Outer surface
D Inclined axis of rotation
DR Double row
G Grid
F1, F2 Degree of freedom
HD Horizontal axis of rotation
KP Buckling point
KU Curve
L Length
OF Surface
P1-P3 Position
PF1,PF2 Arrow
R Diamond
R0, RH1,RH2 Row
R1, R2 Rotational degree of freedom
RB Rotational movement
S Seat
ST1 to ST4 Expansion steps
S1 to Sn Layers
T Supporting structure
T1 Linear movement
VD Vertical axis of rotation

The invention claimed is:

1. A kinetic structural component, comprising:
a flexible structure having at least one degree of freedom, wherein
the flexible structure is movable between a compressed position and an expanded position or vice versa, the movement activated when a backrest of a seat having the structural component moves relative to a seat base, and
wherein the flexible structure comprises at least one substructure which is configured, in the expanded position of the flexible structure, to expand in a linear manner or expand to form a curve or an arc;
wherein the substructure is designed as a flexible grid having a plurality of lever elements which are articulated on at least one link by joints,
wherein the joints are designed as film hinges from polypropylene.

2. The structural component as claimed in claim 1, wherein the substructure comprises a plurality of expansion elements which are coupled in an articulated manner to one another in a row and/or in parallel in order, in the at least one degree of freedom, to expand into the expanded position or to compress into the compressed position.

3. The structural component as claimed in claim 1, wherein the flexible structure is designed as a monolithic flexible structure.

4. The structural component as claimed in claim 1, wherein the at least one link is a moving link.

5. The structural component as claimed in claim 4, wherein the moving link is designed to be narrow and/or flat.

6. The structural component as claimed in claim 4, wherein the lever elements have different lengths, and therefore the lever elements, which are arranged in a row and/or parallel to one another, spread out in an arcuate or curved manner in the expanded state.

7. The structural component as claimed in claim 4, wherein the lever elements have identical lengths, and therefore the lever elements, which are arranged in a row and/or parallel to one another, spread out linearly in the expanded state.

8. The structural component as claimed in claim 1, wherein the flexible structure comprises at least one or more outer surface elements coupled in terms of movement to the substructure.

9. The structural component as claimed in claim 8, wherein the substructure is coupled in terms of movement to the outer surface element(s) in such a manner that the substructure changes its shape and its volume, and it expands, or compresses, depending on a controlled force acting on the link or the links of the substructure.

10. The structural component as claimed in claim 1, wherein the substructure is formed from a plurality of recurring mechanical expansion elements, including lever elements, which are connected by links to form a row.

11. The structural component as claimed in claim 1, wherein the substructure is formed from multiple rows of expansion elements comprising individual rows of expansion elements arranged one above another and/or next to one another.

12. A seat component, including back rest or seat part, wherein the seat component comprises at least:
a supporting structure,
padding and/or a cover element and
a structural component as claimed in claim 1, wherein at least the substructure is coupled in terms of movement to the padding or to the cover element.

13. The seat component as claimed in claim 12, wherein the at least one link is a moving link that is coupled in terms of movement to the padding and/or to the cover element.

14. The seat component as claimed in claim 12, wherein the structural component is arranged between the supporting structure and the padding and/or the cover element.

15. A seat, comprising: a backrest adapted to support at least a lower back portion of an occupant, and a seat base adapted to support at least the buttocks of the occupant, wherein the backrest and the seat base are movable relative to one another and of which at least one of the backrest and seat base comprises a structural component comprising
a flexible structure having at least one degree of freedom, wherein
the flexible structure is movable between a compressed position and an expanded position or vice versa, and
wherein the flexible structure comprises at least one substructure which is configured, in the expanded position of the flexible structure, to expand in a linear manner or expand to form curve or an arc;
wherein the substructure is designed as a flexible grid having a plurality of lever elements which are articulated on at least one link by joints,
wherein the joints are designed as film hinges from polypropylene, wherein, when the backrest moves relative to the seat base, the flexible structure is movable into an expanded or a compressed position.

* * * * *